United States Patent
Perry et al.

(10) Patent No.: US 12,470,416 B1
(45) Date of Patent: Nov. 11, 2025

(54) SECURE, ROBUST, AND EFFICIENT BLOCKCHAIN MANAGEMENT USING LARGE CODEWORD MODELS

(71) Applicant: AtomBeam Technologies Inc., Moraga, CA (US)

(72) Inventors: Alec Perry, Dublin, OH (US); Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/757,419

(22) Filed: Jun. 27, 2024

(51) Int. Cl.
*H04L 9/00* (2022.01)

(52) U.S. Cl.
CPC ..................... *H04L 9/50* (2022.05)

(58) Field of Classification Search
CPC ........... H04L 9/50; H04L 41/16; G06N 3/045; G06N 3/0455; G06N 3/0475
See application file for complete search history.

(56) References Cited

U.S. PATENT DOCUMENTS

| | | | |
|---|---|---|---|
| 2019/0034939 A1* | 1/2019 | Thomas | G06Q 30/0185 |
| 2020/0396065 A1* | 12/2020 | Gutierrez-Sheris | H04L 9/3297 |
| 2022/0150050 A1* | 5/2022 | Gundavelli | H03M 7/70 |
| 2023/0104626 A1* | 4/2023 | Luedtke | H04L 1/0041 714/776 |
| 2023/0315877 A1* | 10/2023 | McMillon | G06F 21/64 726/27 |
| 2024/0220976 A1* | 7/2024 | Davis | G06Q 20/3678 |

FOREIGN PATENT DOCUMENTS

| | | | |
|---|---|---|---|
| CN | 118070812 A | * | 5/2024 |
| CN | 118152351 A | * | 6/2024 |

OTHER PUBLICATIONS

Graham, Latent Transformer Models for out-of-distribution detection, 2023, Medical Image Analysis, vol. 90, pp. 1-11 (Year: 2023).*

* cited by examiner

*Primary Examiner* — Kevin Ayala
(74) *Attorney, Agent, or Firm* — Galvin Patent Law LLC; Brian R Galvin

(57) ABSTRACT

Compressing and re-securing blockchain data using a large codeword model (LCM) with deep learning. The LCM tokenizes the blockchain into sourceblocks, assigns unique codewords to each sourceblock, and processes the codewords through a deep learning core, enabling efficient compression, semantic understanding, and generation of blockchain data. In the event of a compromised block, the system re-encodes and rehashes the entire compressed chain, generating a new secured chain while preserving the original chain as metadata for backward compatibility. The LCM-based approach enhances security, efficiency, and resilience of blockchain networks, offering significant advantages over existing techniques.

6 Claims, 13 Drawing Sheets

SECURE, ROBUST, AND EFFICIENT BLOCKCHAIN MANAGEMENT USING LARGE CODEWORD MODELS

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention relates to the field of blockchain technology and cryptography, and more specifically to systems and methods for securing and re-securing blockchain data using advanced compression and machine learning techniques.

Discussion of the State of the Art

Blockchain technology has revolutionized various industries by providing a decentralized, immutable, and transparent ledger for recording transactions and storing data. However, the security of blockchain systems heavily relies on the integrity of the individual blocks and the cryptographic links between them. If a single block in the chain is compromised or tampered with, it can undermine the trust and reliability of the entire blockchain. Traditional approaches to handling compromised blocks often involve forking the blockchain or reversing transactions, which can be complex, disruptive, and may lead to loss of data or inconsistencies. Moreover, as blockchain networks grow in size and complexity, the computational resources required to maintain and secure them increase significantly.

Recent advancements in machine learning, particularly in the areas of deep learning and natural language processing, have introduced new possibilities for efficiently processing and understanding large-scale data. Models like transformers and variational autoencoders have shown remarkable capabilities in capturing patterns, semantics, and generating meaningful representations from complex data structures.

However, the application of these advanced machine learning techniques to blockchain security has been limited. Existing methods typically focus on detecting anomalies or fraudulent activities using traditional machine learning algorithms, rather than leveraging the power of deep learning to fundamentally enhance the security and efficiency of the blockchain itself. Therefore, there is a need for an innovative approach that combines the strengths of blockchain technology, cryptography, and advanced machine learning to provide a more secure, efficient, and resilient blockchain system. Such a system should be able to detect and mitigate the impact of compromised blocks, enable efficient re-securing of the blockchain without disrupting its integrity, and offer compatibility with existing blockchain infrastructures.

SUMMARY OF THE INVENTION

Accordingly, the inventor has conceived and reduced to practice a system and method for a secure, robust, and efficient blockchain management using large codeword models. The present invention addresses deficiencies by introducing a system and method that utilizes a Large Codeword Model (LCM) for deep learning to process, compress, and re-secure blockchain data. By tokenizing the blockchain into semantic units called sourceblocks, assigning unique codewords to each sourceblock, and processing the codewords through a deep learning core, the proposed system enables efficient compression, semantic understanding, and generation of blockchain data. Moreover, the invention may be used for re-securing a compromised blockchain by re-encoding and rehashing the entire chain, generating a new chain with different hashes while preserving the original chain as metadata for compatibility. This approach leverages the compression and semantic understanding capabilities of the LCM to fundamentally enhance the security and resilience of the blockchain. The proposed system and method offer significant advantages over existing techniques, including improved efficiency, scalability, and security of blockchain networks. By integrating advanced machine learning techniques with blockchain technology, the invention opens up new possibilities for secure and efficient data storage, transaction processing, and application development in various domains.

According to a preferred embodiment, a secure, robust, and efficient blockchain management system using large codeword models, comprising one or more computers with executable instructions that, when executed, cause the deep learning system to: receive an initial blockchain comprising a plurality of blocks; transform the blockchain into a processed blockchain which comprises a plurality of tokens or codewords; extract metadata identifiers corresponding to each block within the initial blockchain; compress the processed blockchain into a compressed blockchain comprising a plurality of compressed blocks by learning relationships between the plurality tokens or codewords with a deep learning core; secure the compressed blockchain by passing the plurality of compressed blocks through a secure hash function, wherein each compressed block is assigned a secure hash value; embed the secure hash value of a block in a next successive block for the entirety of the compressed blockchain; and append the metadata identifiers to their corresponding compressed block within the compressed blockchain, is disclosed.

According to another preferred embodiment, a method for a secure, robust, and efficient blockchain management using large codeword models, comprising the steps of: receiving an initial blockchain comprising a plurality of blocks; transforming the blockchain into a processed blockchain which comprises a plurality of tokens or codewords; extracting metadata identifiers corresponding to each block within the initial blockchain; compressing the processed blockchain into a compressed blockchain comprising a plurality of compressed blocks by learning relationships between the plurality tokens or codewords with a deep learning core; securing the compressed blockchain by passing the plurality of compressed blocks through a secure hash function, wherein each compressed block is assigned a secure hash value; embedding the secure hash value of a block in a next successive block for the entirety of the compressed blockchain; and append the metadata identifiers to their corresponding compressed block within the compressed blockchain, is disclosed.

According to another preferred embodiment, a non-transitory, computer-readable storage media having computer-executable instructions embodied thereon that, when executed by one or more processors of a computing system employing an asset registry platform for secure, robust, and efficient blockchain management system using large codeword models, cause the computing system to: receive an initial blockchain comprising a plurality of blocks; transform the blockchain into a processed blockchain which comprises a plurality of tokens or codewords; extract metadata identifiers corresponding to each block within the initial blockchain; compress the processed blockchain into a compressed blockchain comprising a plurality of compressed blocks by learning relationships between the plurality tokens or codewords with a deep learning core; secure the compressed blockchain by passing the plurality of compressed blocks through a secure hash function, wherein each compressed block is assigned a secure hash value; embed the secure hash value of a block in a next successive block for the entirety of the compressed blockchain; and append the metadata identifiers to their corresponding compressed block within the compressed blockchain, is disclosed.

According to an aspect of an embodiment, the deep learning core comprises a transformer architecture.

According to an aspect of an embodiment, the deep learning core comprises a Variational Autoencoder architecture.

According to an aspect of an embodiment, the deep learning core comprises a latent transformer architecture.

BRIEF DESCRIPTION OF THE DRAWING FIGURES

DETAILED DESCRIPTION OF THE INVENTION

Figure 1:
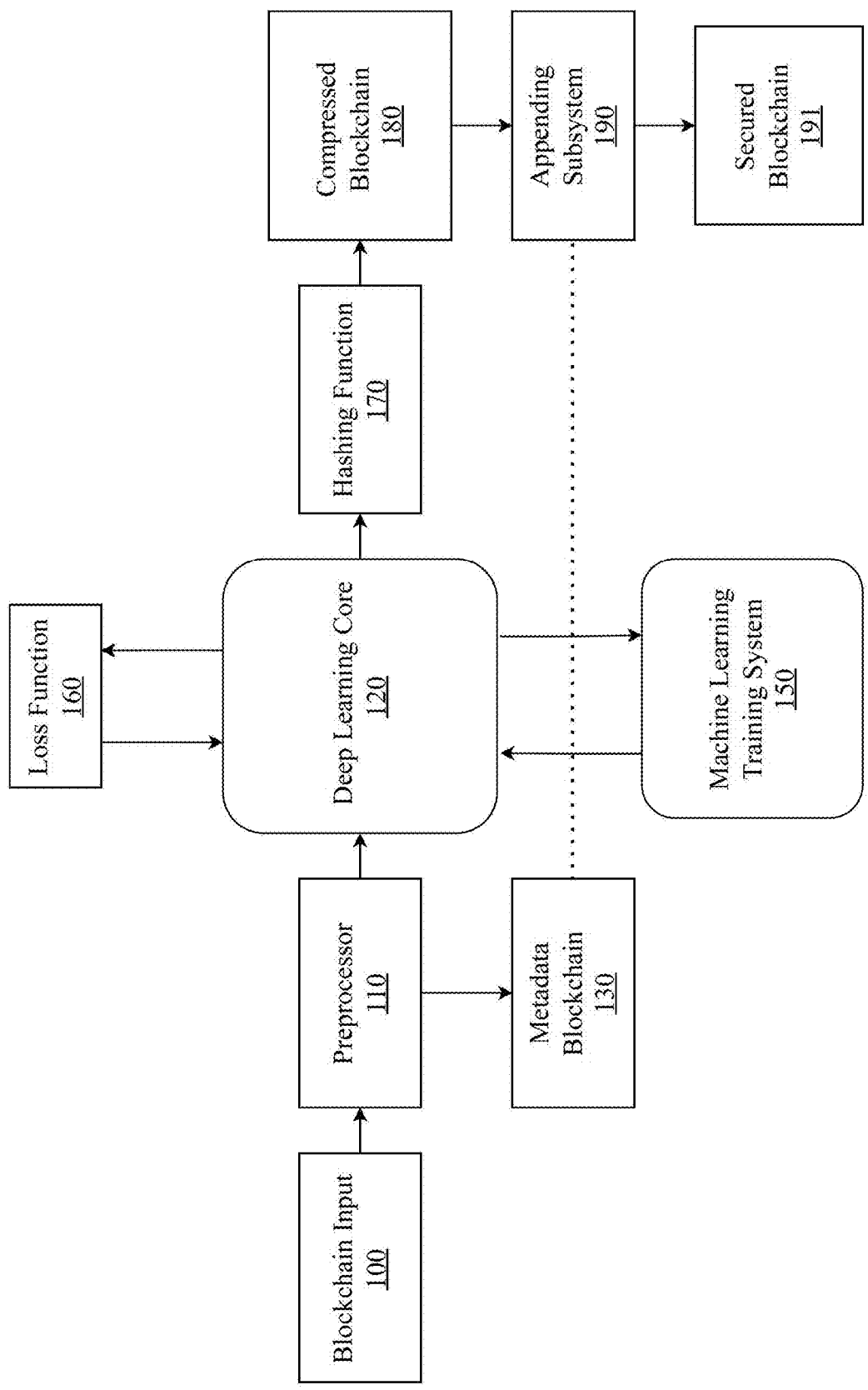
FIG. 1 is a block diagram illustrating an exemplary system architecture of a system for blockchain management using large codeword models.

The inventor has conceived, and reduced to practice, a system and method for secure, robust, and efficient blockchain management using large codeword models. The present invention discloses a system and method for securing and maintaining the integrity of a blockchain while ensuring compatibility with legacy systems. The invention addresses the challenge of migrating a blockchain to a new and secure hash function when the currently used hash function becomes compromised, without disrupting the operation of existing systems and infrastructure. The invention comprises a data preprocessor that either tokenizes the blockchain data or chunks the data into sourceblocks and assigns unique codewords to each sourceblock based on a codebook. A deep learning core then compresses the codewords or tokens using advanced compression techniques, generating a compressed representation of the blockchain data. An updated hashing function is applied to the compressed data to generate new hash values for each block. The appending subsystem creates a secured blockchain by generating a validation portion containing the compressed data and new hash values, and appending compatibility metadata that includes the previous hash function architecture. A validation service can validate blocks in the secured blockchain using the updated hashing function, while the legacy system interface enables legacy systems to validate blocks using the previous hashing function stored in the compatibility metadata. This dual validation approach ensures the integrity of the blockchain and maintains compatibility with existing systems during the transition to the new hash function.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "sourceblock" refers to a semantically meaningful unit of text that is derived from the input data through a process called syntactic splitting. Syntactic splitting involves breaking down the input text into smaller chunks along syntactic boundaries, such as those between words or tokens. These resulting chunks, or sourceblocks, serve as the basic units of representation in LCMs, replacing the traditional word or subword tokens used in Large Language Models (LLMs). Each sourceblock is then assigned a unique codeword from a codebook, which allows for efficient compression and processing of the text data. By preserving syntactic and semantic information within sourceblocks, LCMs aim to capture the inherent structure and meaning of the language more effectively while achieving higher compression ratios compared to LLMs.

As used herein, "deep learning core" refers to the central component responsible for processing and learning from the codeword representations derived from the input data. This core can consist of one or more machine learning architectures, working individually or in combination, to capture the patterns, relationships, and semantics within the codeword sequences. Some common architectures that can be employed in the deep learning core of LCMs include but are not limited to transformers, variational autoencoders (VAEs), recurrent neural networks (RNNs), convolutional neural networks (CNNs), and attention mechanisms. These architectures can be adapted to operate directly on the codeword representations, with or without the need for traditional dense embedding layers. The deep learning core learns to map input codeword sequences to output codeword sequences, enabling tasks such as language modeling, text generation, and classification. By leveraging the compressed and semantically rich codeword representations, the deep learning core of LCMs can potentially achieve more efficient and effective learning compared to traditional token-based models. The specific choice and configuration of the machine learning architectures in the core can be tailored to the characteristics of the input data and the desired output tasks, allowing for flexibility and adaptability in the design of LCMs.

As used herein, "codeword" refers to a discrete and compressed representation of a sourceblock, which is a meaningful unit of information derived from the input data. Codewords are assigned to sourceblocks based on a codebook generated by a codebook generation system. The codebook contains a mapping between the sourceblocks and their corresponding codewords, enabling efficient representation and processing of the data. Codewords serve as compact and encoded representations of the sourceblocks, capturing their essential information and characteristics. They are used as intermediate representations within the LCM system, allowing for efficient compression, transmission, and manipulation of the data.

Conceptual Architecture

FIG. 1 is a block diagram illustrating an exemplary system architecture of a system for blockchain management using large codeword models. The system takes a blockchain input 100 as its starting point, which represents the raw, unprocessed blockchain data. This input is then fed into a data preprocessor 110, which is responsible for preparing the blockchain data for further processing. The data preprocessor 110 performs tasks such as cleaning, formatting, and normalizing the data to ensure it is in a suitable format for the subsequent components.

In one embodiment, the data preprocessor 110 includes a sourceblock generator 214 and a codeword allocator 213. The sourceblock generator 214 splits the blockchain data into smaller, semantically meaningful units called sourceblocks. These sourceblocks capture the essential information and structure of the blockchain data. The codeword allocator 213 then assigns unique codewords to each sourceblock, creating a compressed representation of the blockchain. The codewords are generated based on a predefined codebook or learned through techniques such as Huffman coding or other encoding methods. Codebooks may be generated and managed by a codebook generation system 240. By converting the blockchain data into codewords, the system achieves efficient compression while preserving the critical information. In another embodiment, the data preprocessor 110 may employ traditional tokenization techniques, where the blockchain data is divided into tokens. These tokens can represent individual transactions, blocks, or other relevant units of the blockchain. The tokenized blockchain data is then passed to the deep learning core 120 for further processing.

The preprocessed blockchain data then enters a deep learning core 120, which is the central component of the system. The deep learning core 120 is a specialized deep learning model that leverages the power of various architectures to process and compress the blockchain data. It learns to capture the inherent patterns, relationships, and semantics within the blockchain, enabling efficient representation and encoding of the data. The deep learning core 120 is a flexible and adaptable module that can incorporate various machine learning architectures tailored to the specific requirements of the blockchain data. These architectures include but are not limited to transformers, Variational Autoencoders (VAEs), and latent transformers.

A transformer-based architecture leverages the power of self-attention mechanisms to process and compress the blockchain data efficiently. VAE-based architectures are generally comprised of an encoder and a decoder. The encoder compresses the blockchain data into a latent space representation, while the decoder reconstructs the original data from the latent space. A latent transformer architecture combines the strengths of VAEs and transformers. In this setup, the VAE encoder compresses the blockchain data into a latent space, and a transformer without positional encoding or embedding layers operates on the latent space vector representations to form a compressed blockchain output. The chosen architecture within the deep learning core 120 learns to capture the inherent patterns, relationships, and semantics within the blockchain data, enabling efficient representation and encoding.

The deep learning core 120 works in conjunction with a loss function 160 as part of a larger machine learning training system 150. The loss function 160 measures the discrepancy between the deep learning core's output and the expected outcome, providing a quantitative measure of the model's performance.

As the deep learning core 120 processes the blockchain data, it generates a compressed representation of the blockchain, which may be passed through a hashing function 170. The hashing function 170 creates a unique, fixed-size hash value for each compressed block, ensuring the integrity and immutability of the data. These hashed, compressed blocks form a compressed and secured blockchain 180, which is the final output of the system.

A hashing function is a mathematical algorithm that takes an input of arbitrary size and produces an output of fixed size, known as a hash or digest. The hashing function used in the system is designed to be cryptographically secure, meaning that it is computationally infeasible to find two different inputs that produce the same hash output (collision resistance) or to determine the original input from the hash output (preimage resistance).

In the context of the compressed blockchain, the hashing function 170 takes each compressed block as input and generates a unique hash value. This hash value serves as a digital fingerprint of the compressed block, allowing for easy verification of its integrity. If even a single bit of the compressed block is altered, the resulting hash value will be entirely different, indicating tampering or corruption. Some commonly used cryptographic hashing functions include but are not limited to SHA-256, Keccak-256, and Scrypt. SHA-256 is widely used in blockchain technologies, including Bitcoin. It produces a 256-bit (32-byte) hash output and is known for its security and performance. Keccak-256 is the hashing function used in the Ethereum blockchain. It is a variant of the SHA-3 family of hashing functions and produces a 256-bit hash output. Scrypt is a memory-hard hashing function that is designed to be resistant to hardware-based attacks, such as those using Application-Specific Integrated Circuits (ASICs).

When a compressed block is passed through the hashing function 170, the resulting hash value is appended to the compressed blockchain 180. This creates a chain of hash values, where each block's hash is dependent on the hash of the previous block. Any modification to a block in the chain will invalidate all subsequent block hashes, making it easy to detect and prevent tampering. For example, let's say the compressed blockchain 180 consists of three blocks: Block A, Block B, and Block C. Each block is compressed and then hashed using the SHA-256 function: Block A (compressed): "abc" receives Hash A: "ba7816bf . . . ," Block B (compressed):

"def" receives Hash B: "cb8379ac . . . ," (includes Hash A), and Block C (compressed): "ghi" receives Hash C: "1c8affoc . . . " (includes Hash B).

If an attacker tries to modify Block B, the hash of Block B will change, and consequently, the hash of Block C will also change. By comparing the hash values, it becomes evident that the blockchain has been tampered with, ensuring the integrity of the compressed blockchain. The combination of the deep learning core 120 for efficient compression and the hashing function 170 for security and integrity provides a robust and reliable system for processing and securing blockchain data.

To maintain compatibility with existing blockchain systems and protocols, the system also generates a metadata blockchain 130. The metadata blockchain 130 stores additional information about the original blockchain, such as block headers, timestamps, and other relevant metadata. This metadata is appended to the compressed blockchain 180, allowing seamless integration with existing blockchain infrastructure.

The interaction between the deep learning core 120, the machine learning training system 150, and the loss function 160 enables the system to continuously learn and adapt to new blockchain data. As more data is processed, the deep learning core 120 refines its understanding of the blockchain's structure and semantics, leading to improved compression and security.

The system's ability to repeatedly compress and rehash the blockchain is a feature that enables the re-securing of compromised chains without the need for forking or splitting. This iterative process, which can be performed N number of times, allows for the continuous strengthening of the blockchain's security, as long as the data remains compressible. The primary goal of compression in this context is not to achieve the maximum reduction in size but rather to transform the compromised blockchain into a new, rehashable form. By applying the deep learning core 120 to the blockchain data, the system generates a compressed representation that captures the essential information and structure of the original chain. This compressed form serves as a fresh starting point for the rehashing process, effectively creating a new, secure version of the blockchain.

The iterative nature of this process is particularly valuable in scenarios where the blockchain may be subject to ongoing attacks or vulnerabilities. By repeatedly compressing and rehashing the chain, the system can adapt to evolving security threats and maintain the integrity of the blockchain over time. Each iteration of the process results in a new, unique hash chain, making it increasingly difficult for attackers to compromise the blockchain.

The system has the ability to maximize a compression ratio enabling efficient storage of compressed blockchains, or the ability to minimize the compression ratio while maintaining essential information necessary to enable the creation of a compressed form that is well-suited for the rehashing process. By only compressing a block as much as necessary to maintain essential information but be left with a new chain for hashing purposes, the resulting blockchain may be further compressed any time a secure threat emerges. This can be repeated as long as further compression is possible.

Furthermore, by avoiding the need for forking or splitting the blockchain, this iterative compression and rehashing approach maintains the continuity and integrity of the chain. Forking or splitting can lead to confusion, inconsistencies, and potential vulnerabilities in the blockchain network. By re-securing the chain through compression and rehashing, the system provides a seamless and non-disruptive way to strengthen the blockchain's security without causing disruption to the network or its participants.

The ability to repeatedly compress and rehash the blockchain, as long as it remains compressible, is a powerful feature of the system. It allows for the continuous re-securing of compromised chains without the need for forking or splitting, ensuring the long-term integrity and security of the blockchain. The deep learning core 120 plays a c role in this process by generating compressed representations that capture the essential information and structure of the blockchain, enabling effective rehashing and adaptation to evolving security threats.

In an embodiment, the system includes an appending subsystem 190. The appending subsystem 190 is responsible for combining the compressed blockchain 180 with the metadata blockchain 130 to create a single, integrated blockchain structure. It plays a vital role in ensuring backward compatibility and enabling seamless interaction with existing infrastructure and applications.

The appending subsystem 190 takes two inputs: the compressed blockchain 180 and the metadata blockchain 130. The subsystem establishes a logical link between the compressed blocks and their corresponding metadata. This linking process can be achieved through various techniques, depending on the specific implementation and requirements of the system. One common approach is to include reference pointers within the compressed blockchain structure that point to the associated metadata in the metadata blockchain 130. These reference pointers act as a bridge, allowing the system to efficiently retrieve the relevant metadata when needed. Another approach is to embed the metadata directly into the compressed blockchain structure, creating a self-contained and tightly coupled appended blockchain. In this case, the appending subsystem 190 carefully integrates the metadata into the compressed blocks, ensuring the integrity and consistency of the overall blockchain structure. Regardless of the specific linking technique used, the appending subsystem 190 maintains the proper relationships between the compressed blocks and their associated metadata, guaranteeing the coherence and reliability of the appended blockchain. The resulting output is a unified blockchain that combines the security and efficiency of the compressed and rehashed blockchain with the backward compatibility provided by the metadata. This appended blockchain can be seamlessly integrated into existing systems, enabling them to interact with the new blockchain structure without requiring significant modifications or upgrades. The appending subsystem's 190 functionality is critical in facilitating a smooth transition from the old blockchain to the new, compressed and secured version, while maintaining the integrity and functionality of the existing ecosystem.

The appending subsystem 190 is responsible for combining the compressed blockchain data with the corresponding metadata identifiers, creating a unified structure that preserves the essential information required by existing systems. The metadata identifiers extracted from the original blockchain contain vital information such as block headers, transaction hashes, timestamps, and other relevant details. These identifiers serve as a bridge between the compressed blockchain and the original blockchain, allowing legacy systems to interpret and interact with the data effectively.

To facilitate the metadata appending process, the deep learning system may employ a structured approach for organizing and linking the metadata to the compressed blocks. One common technique is to create a separate metadata database or index that maps the metadata identifiers to their corresponding compressed blocks. This database maintains a one-to-one relationship between the metadata and the compressed data, enabling efficient retrieval and association.

Another approach is to embed the metadata directly within the compressed blockchain structure. In this case, the appending subsystem allocates dedicated fields or sections within each compressed block to store the relevant metadata identifiers. This embedded metadata becomes an integral part of the compressed blockchain, ensuring a tight coupling between the data and its associated metadata.

The choice of the metadata appending technique depends on factors such as the size of the metadata, the frequency of updates, and the desired level of integration with the compressed blockchain. The deep learning system's modular architecture allows for flexibility in selecting the most appropriate metadata appending approach based on the specific requirements of the blockchain network.

Regardless of the chosen technique, the appending subsystem ensures that the metadata identifiers are properly linked to their corresponding compressed blocks. This linking process maintains the integrity and consistency of the blockchain data, guaranteeing that the metadata remains associated with the correct blocks even after compression and rehashing.

To facilitate seamless integration with legacy systems, the deep learning system may provide a compatibility layer that allows existing systems to access and utilize the appended metadata. This compatibility layer may include but is not limited to APIs, protocols, and data formats that enable legacy systems to retrieve and interpret the metadata identifiers associated with the compressed blocks. By leveraging the appended metadata, legacy systems can continue to operate and interact with the blockchain data without requiring significant modifications to their existing infrastructure. An example using exemplary PyTorch pseudocode of a system for compressing and re-securing compromised blockchains using a deep learning LCM core may be found in APPENDIX A.

Figure 2:
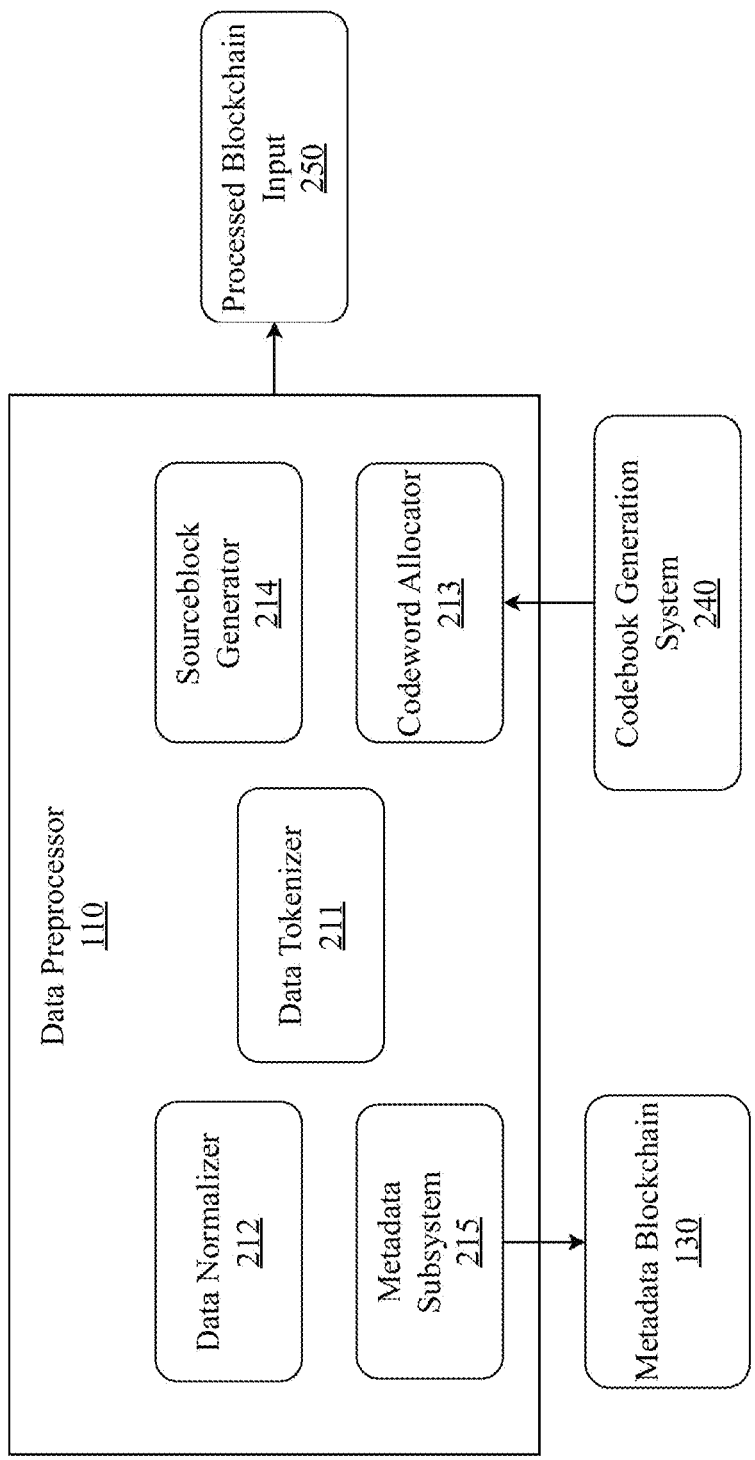
FIG. 2 is a block model illustrating an aspect of a system for blockchain management using large codeword models, a data preprocessor.

FIG. 2 is a block model illustrating an aspect of a system for blockchain management using large codeword models, a data preprocessor. A data preprocessor 110 plays a crucial role in preparing the raw blockchain data for further processing by the deep learning core 120 and the hashing function 170. The data preprocessor 110 comprises several subsystems that work together to transform the raw blockchain data into a suitable format. One subcomponent is a data tokenizer 211, which is responsible for breaking down the blockchain data into smaller, manageable units called tokens. Tokenization helps in reducing the complexity of the data and enables more efficient processing.

In one embodiment, rather than tokenization, the data preprocessor 110 may assign codeword to a blockchain input. A sourceblock generator 214 breaks text, images, time series data, or other data types into smaller, logical units called sourceblocks. Sourceblocks are designed to capture meaningful and coherent segments of the blockchain data, such as individual transactions or blocks. By organizing the data into sourceblocks, the system can process and analyze the blockchain more effectively. A codeword allocator 213 is responsible for assigning unique codewords to each token or sourceblock generated by the sourceblock generator 214. The codeword allocator 213 compresses the blockchain data by replacing the original tokens or sourceblocks with shorter, fixed-length codewords. This compression process reduces the overall size of the data and improves the efficiency of subsequent processing steps.

The codeword allocator 213 works in conjunction with the codebook generation system 240, which creates and maintains a codebook that defines the mapping between tokens or sourceblocks and their corresponding codewords. The codebook is generated based on the frequency and distribution of the tokens or sourceblocks in the blockchain data. Tokens or sourceblocks that occur more frequently are assigned shorter codewords, while less frequent ones are assigned longer codewords. This approach optimizes the compression ratio and ensures that the most common elements in the blockchain are represented efficiently.

When the codeword allocator 213 receives a token or sourceblock from the sourceblock generator 214, it consults the codebook to determine the corresponding codeword. The allocator then replaces the original token or sourceblock with its assigned codeword, creating a compressed representation of the data. This process is repeated for each token or sourceblock in the blockchain, resulting in a compressed version of the entire dataset. The codeword allocator 213 may employ various techniques to assign codewords efficiently. One common approach is to use a prefix-free coding scheme, such as Huffman coding, which ensures that no codeword is a prefix of any other codeword. This property allows for unambiguous decoding of the compressed data during the reconstruction process. Additionally, the codeword allocator 213 may utilize data structures like hash tables or binary search trees to enable fast lookup and assignment of codewords, optimizing the performance of the compression process.

By allocating codewords to tokens or sourceblocks, the codeword allocator 213 achieves data compression, reducing the size of the blockchain data while preserving its essential information. The compressed representation generated by the allocator is then passed on to the deep learning core 120 and the hashing function 170 for further processing and analysis. The use of codewords not only improves storage efficiency but also facilitates faster processing and transmission of the blockchain data, as the compressed representation requires less computational resources and bandwidth.

The tokenized or codeword allocated data may be passed through a data normalizer 212, which performs various data normalization techniques to ensure consistency and standardization across the dataset. Normalization may involve tasks such as removing inconsistencies, handling missing or incomplete data, and converting data into a common format or scale. This step improves the quality and reliability of the data.

The output of the data preprocessor 110 is the processed blockchain input 250, which represents the transformed and compressed version of the raw blockchain data. This processed data is ready to be fed into the deep learning core 120 and the hashing function 170 for further analysis and security enhancement.

To ensure the compressed blockchain output from the deep learning core is compatible with existing systems, metadata from the decompressed blockchain may be appended. A metadata subsystem 215 is responsible for extracting and managing relevant metadata from the original blockchain. Metadata includes information such as block headers, transaction hashes, timestamps, and other pertinent details that describe the structure and properties of the blockchain. The metadata subsystem 215 analyzes the raw blockchain data and collects the necessary metadata. It organizes and structures the metadata into a format that is suitable for appending to the compressed blockchain 180. The resulting metadata blockchain 130 serves as a complementary component to the main blockchain, providing additional context and enabling backward compatibility with existing systems. The metadata blockchain 130 is generated in parallel with the processed blockchain input 250 and is later integrated with the compressed blockchain 180 through an appending subsystem 190. This integration ensures that the final appended blockchain retains the essential metadata information, facilitating seamless interaction with legacy systems and applications.

Figure 3:
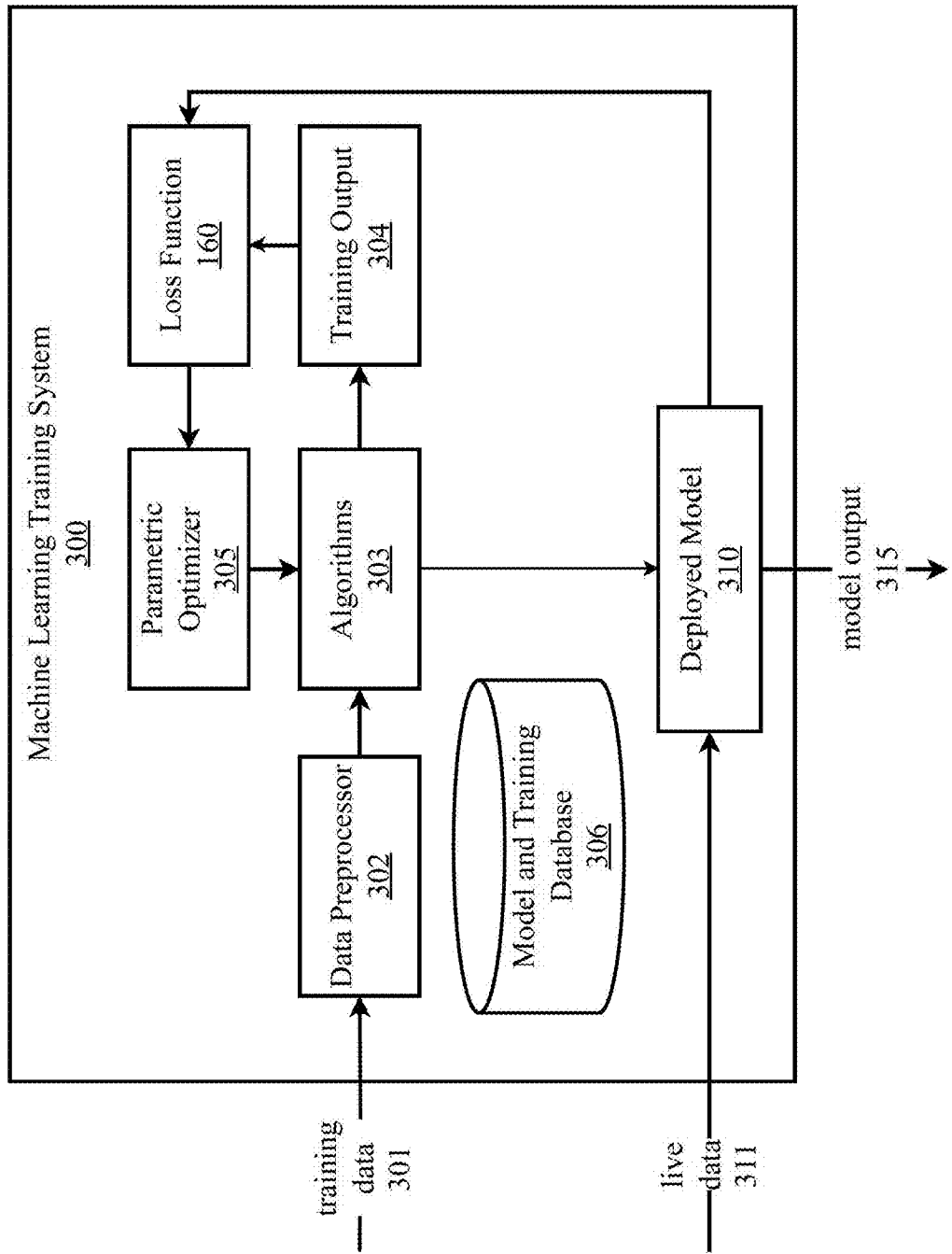
FIG. 3 is a block model illustrating an aspect of a system for blockchain management using large codeword models, a machine learning training system.

FIG. 3 is a block model illustrating an aspect of a system for blockchain management using large codeword models, a machine learning training system. According to the embodiment, the machine learning training system 150 may comprise a model training stage comprising a data preprocessor 302, one or more machine and/or deep learning algorithms 303, training output 304, and a parametric optimizer 305, and a model deployment stage comprising a deployed and fully trained model 310 configured to perform tasks described herein such as processing codewords through a large codeword model. The machine learning training system 150 may be used to train and deploy a plurality of deep learning architectures in order to support the services provided by the large codeword model for deep learning. In one embodiment, machine learning training system 150 may be used to train the deep learning core 120. If the deep learning core 120 comprises a plurality of different deep learning architectures, the machine learning training system 150 may train each of the deep learning architectures separately or together as a single system.

At the model training stage, a plurality of training data 301 may be received by the generative AI training system 350. Data preprocessor 302 may receive the input data (e.g., codewords, codeword vector inputs, latent space vector representations, tokens) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 302 may also be configured to create training dataset, a validation dataset, and a test set from the plurality of input data 301. For example, a training dataset may comprise 80% of the preprocessed input data, the validation set 10%, and the test dataset may comprise the remaining 10% of the data. The preprocessed training dataset may be fed as input into one or more machine and/or deep learning algorithms 303 to train a predictive model for object monitoring and detection.

During model training, training output 304 is produced and used to measure the accuracy and usefulness of the predictive outputs. During this process a parametric optimizer 305 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning training system 150 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 160 to measure the system's performance. The loss function 160 compares the training outputs with an expected output and determined how the algorithm needs to be changed in order to improve the quality of the model output. During the training stage, all outputs may be passed through the loss function 160 on a continuous loop until the algorithms 303 are in a position where they can effectively be incorporated into a deployed model 315.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 310 in a production environment making predictions based on live input data 311 (e.g., codewords, codeword vector inputs, latent space vector representations, tokens). Further, model correlations and restorations made by deployed model can be used as feedback and applied to model training in the training stage, wherein the model is continuously learning over time using both training data and live data and predictions. A model and training database 306 is present and configured to store training/test datasets and developed models. Database 306 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 303 may comprise a deep learning algorithm such as neural networks (e.g., recurrent, convolutional, long short-term memory networks, etc.).

In some implementations, the machine learning training system 150 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 306.

Figure 4:
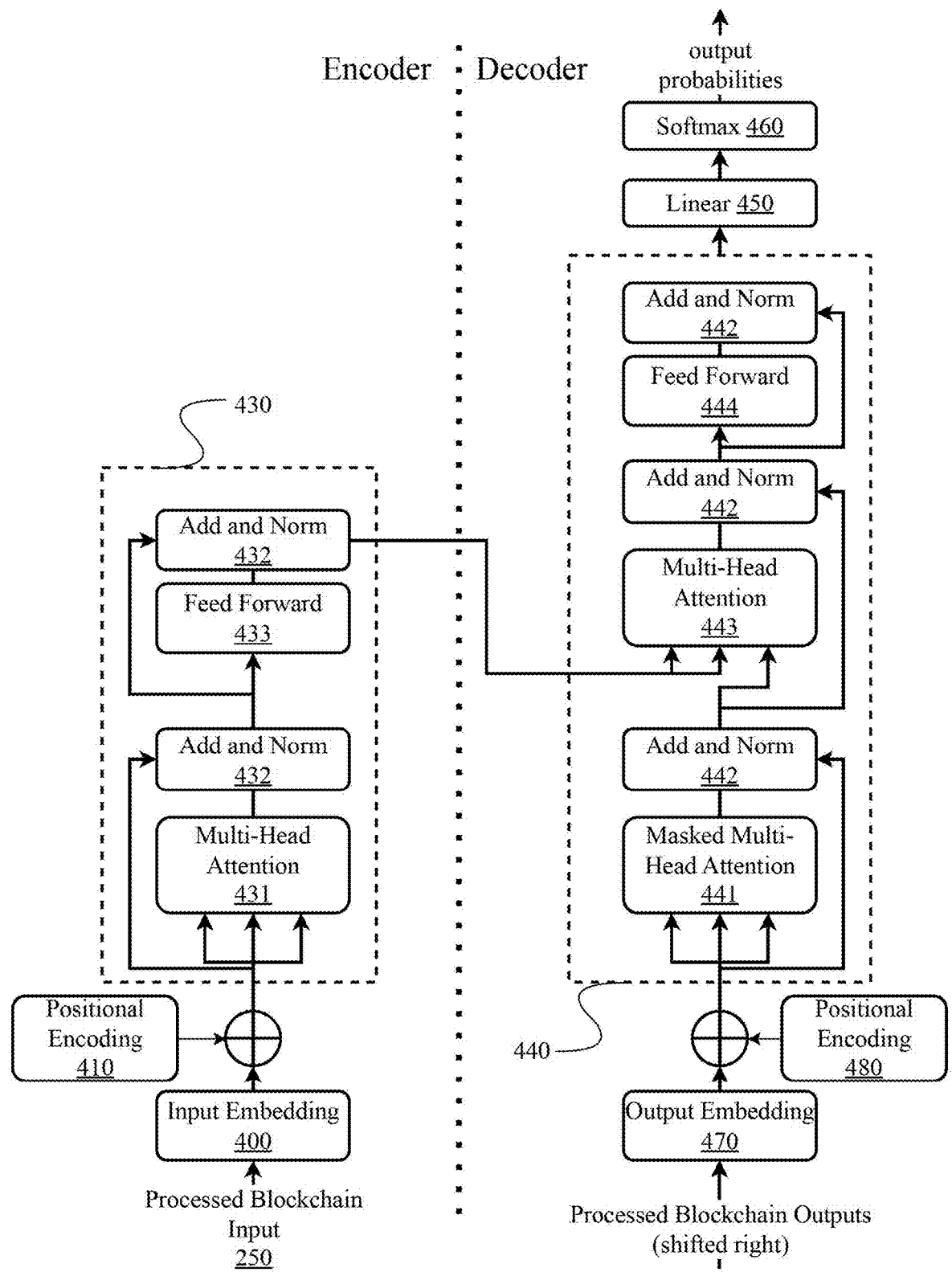
FIG. 4 is a block diagram illustrating an exemplary system architecture of a system for blockchain management using large codeword models, where the deep learning core uses a transformer.

FIG. 4 is a block diagram illustrating an exemplary system architecture of a system for blockchain management using large codeword models, where the deep learning core uses a transformer. A Transformer generally comprises an Encoder (the components on the left side of the illustration) and a Decoder (the components on the right side of the illustration).

The illustrated Transformer comprises an Encoder and a Decoder. The Encoder takes input embeddings and processes them through a stack of layers (represented as dashed box 430). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed blockchain as its input 250. The input embedding 400 to the Encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"~"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 410 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The Encoder utilizes a multi-head attention mechanism 431 which is a key component of the Transformer architecture. It allows the Encoder to attend to different parts of the input sequence and capture dependencies between tokens. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each token in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 431.

After the Multi-Head Attention layer, a residual connection is applied, followed by Layer Normalization at add and norm 432. The residual connection adds the input embeddings to the output of the attention layer, helping the model learn faster and deeper. Layer Normalization normalizes the activations across the features, stabilizing the training process.

The Feed Forward layer 433 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 432 are applied after the Feed Forward layer.

The Encoder layers 430 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 440). The output embedding layer 470 takes the previous process blockchain output tokens or codewords (shifted right by one position) and converts them into dense vectors. Each token is mapped to a learnable embedding vector of a fixed size. The embedding vectors capture semantic and syntactic relationships between tokens.

Positional encoding 480 is added to the output embedding 470 to provide position information to the model. Since the Transformer architecture does not have inherent recurrence or convolution, positional encodings help capture the order and relative positions of tokens. The positional encodings are typically sine and cosine functions of different frequencies, allowing the model to learn relative positions.

The masked multi-head attention 441 mechanism prevents the model form attending to future tokens. This layer performs self-attention on the Decoder's input sequence. It allows the Decoder to attend to different parts of its own input sequence. The attention is "masked" to prevent the Decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 442. The residual connection adds the input to the output of the attention layer, helping the model learn faster and deeper. Layer normalization normalizes the activations across the features, stabilizing the training process.

The multi-head attention 443 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

Another add and norm 442 layer is then followed by feed forward network 444. This a fully connected feed-forward network applied to each position of the Decoder's hidden states. It consists of two linear transformations with a Rectified Linear Unit (ReLU) activation in between. The feed forward layer helps the model capture non-linear interactions and increases the model's capacity.

Another add and norm 442 layer is followed by linear 450 and softmax 460 layers. The final hidden states of the Decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the Decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the Decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the Decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The Decoder layers 440 can be stacked Nx times, allowing the model to capture complex dependencies and generate coherent output sequences.

This transformer architecture allows the model to process input sequences, capture long-range dependencies, and generate output sequence based on the encoded input and the previously generated codewords.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x\_1, x\_2, \ldots, x\_{t-1})$, where $x\_t$ is the element at position t, and $x\_1, x\_2, \ldots, x\_{t-1}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the auto-regressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 5:
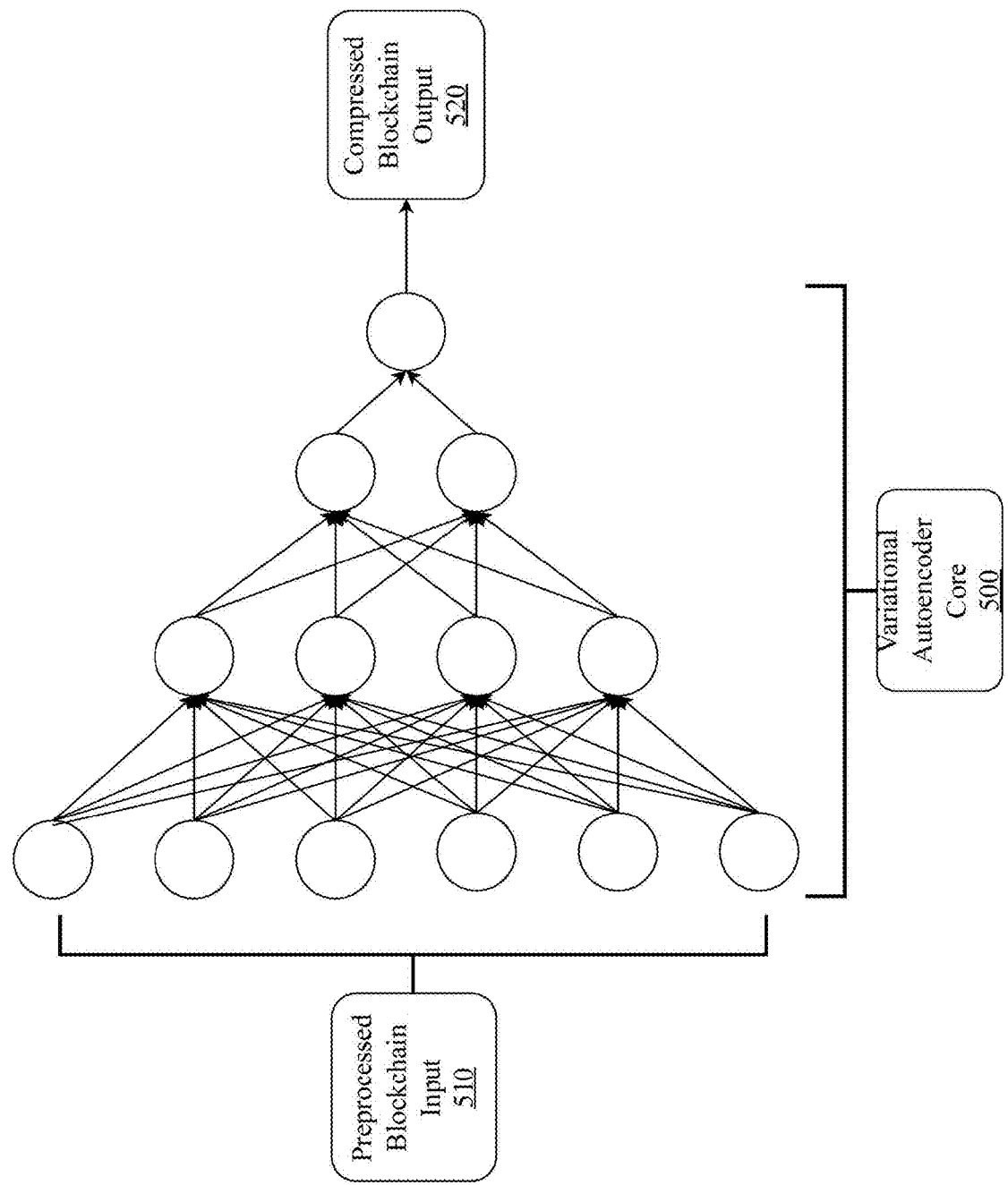
FIG. 5 is a block diagram illustrating an exemplary system architecture of a system for blockchain management using large codeword models, where the deep learning core uses a Variational Autoencoder (VAE).

FIG. 5 is a block diagram illustrating an exemplary system architecture of a system for blockchain management using large codeword models, where the deep learning core uses a Variational Autoencoder (VAE). A VAE Encode Subsystem is responsible for compressing the input codeword vectors into a lower-dimensional latent space representation, enabling efficient processing and data generation.

The VAE core 500 takes a preprocessed blockchain 510 as its input. This preprocessed blockchain is generated by the data preprocessor 110, which converts the raw blockchain inputs into a processed blockchain input 250 through techniques such as tokenization or codeword allocation. Inside the VAE core 500, the preprocessed blockchain 510 undergoes a series of transformations to map it into the latent space. The encoder architecture typically consists of multiple layers of neural networks, such as fully connected layers or convolutional layers, depending on the nature of the input data.

A layer of the encoder takes the codeword vector and applies a linear transformation to project it into a higher-dimensional space. This transformation is learned during the training process and helps to capture the complex patterns and relationships within the input data. The output of this layer may be passed through a non-linear activation function, such as the rectified linear unit (ReLU), to introduce non-linearity and enhance the representational power of the encoder.

As the preprocessed blockchain 510 progresses through the subsequent layers of the encoder, the dimensionality of the representation is gradually reduced. Each layer applies a linear transformation followed by a non-linear activation function, allowing the encoder to learn hierarchical features and abstract representations of the input data.

The VAE core 500 can be trained independently or jointly with the other machine learning components. The flexibility in training allows for optimizing the VAE core based on specific requirements and available resources. When trained individually, the VAE core can focus on learning the optimal compression and representation of the input blockchains in the latent space.

Once the VAE Encoder Subsystem 150 is trained, it can map the preprocessed blockchain input 510 to a lower-dimensional latent space representation. This latent space vector captures the essential features and characteristics of the input blockchain in a compressed form. The dimensionality of the latent space vector is typically much smaller than the original blockchain, allowing for efficient storage and processing.

Latent space vectors possess the property of continuous differentiability. This means that the latent space formed by these vectors is a smooth and continuous manifold, allowing for smooth interpolation and gradual transitions between different points in the latent space. The continuous differentiability of latent space vectors has important implications for the similarity and relatedness of the outputs generated by the deep learning core. In the latent space, outputs that are more proximate to one another, i.e., closer in terms of their latent vector representations, tend to exhibit higher levels of similarity. This is because the VAE core 500 learns to map similar blockchain elements to nearby regions in the latent space, capturing their shared characteristics and underlying patterns.

In a VAE core 500 the shape of the tensors undergoes transformations as they are compressed and decompressed. The VAE core 500 is responsible for compressing the blockchain input into a lower-dimensional latent space representation. The specific shape and dimensionality of the tensors at each stage of the encoding and decoding process can be adjusted based on the goals and requirements of the system.

The VAE core 500 takes the preprocessed blockchain input, which is typically in the form of a high-dimensional vector or tensor, and applies a series of transformations to reduce its dimensionality. The shape of the tensor at each layer of the VAE core 500 can be customized based on the desired level of compression and the complexity of the input data. For example, after passing through the first layer of the encoder, the expanded input vector may be reduced to a tensor with 1000 elements. This compression step aims to capture the most salient features and patterns in the blockchain input while reducing its dimensionality. The subsequent layers of the encoder can further compress the tensor, reducing it to even lower dimensions, such as 50 or 10 elements, depending on the specific training parameters and the desired level of compression.

The choice of the target dimensionality for the latent space representation depends on various factors, such as the nature of the blockchain, the complexity of the patterns and relationships to be captured, and the available computational resources. A smaller latent space dimensionality can lead to higher compression rates and more efficient processing, but it may also result in a loss of information and reduced expressiveness. On the other hand, a larger latent space dimensionality allows for more detailed and nuanced representations but may require more computational resources and longer training times.

Figure 6:
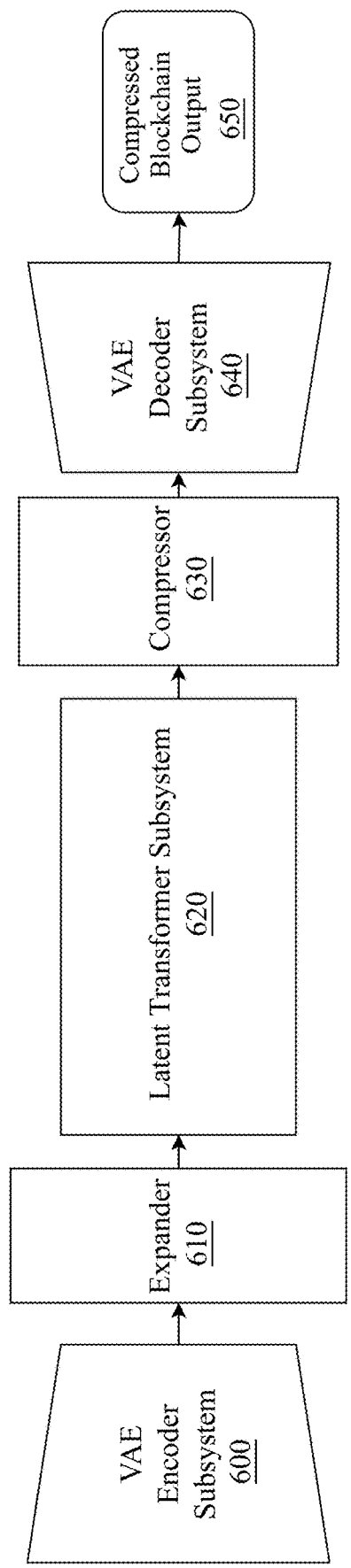
FIG. 6 is a block diagram illustrating an exemplary system architecture of a system for blockchain management using large codeword models, where the deep learning core uses a latent transformer.

FIG. 6 is a block diagram illustrating an exemplary system architecture of a system for blockchain management using large codeword models, where the deep learning core uses a latent transformer. At the heart of the system is a Latent Transformer Subsystem 620, which serves as the central processing unit responsible for learning the underlying patterns, relationships, and dependencies within the input data. The Latent Transformer Subsystem 620 leverages advanced techniques such as self-attention mechanisms and multi-head attention to capture the complex interactions and sequences in the data, enabling it to generate accurate and context-aware outputs.

The input to the Latent Transformer Subsystem 620 is provided by a VAE Encoder Subsystem 600. The VAE Encoder Subsystem 600 is responsible for encoding a pre-processed blockchain input 250 into a lower-dimensional latent space representation. The blockchain input 250 is passed through the VAE Encoder Subsystem 600, which learns to compress the data into a compact latent space representation while preserving the essential features and characteristics of the input. Latent space vectors produced by the VAE Encoder Subsystem 600 may be further processed by an expander 610, which increases the dimensionality of the input data to a point where the vectors can be efficiently processed by the Latent Transformer Subsystem 620.

A latent space representation of the blockchain input 250 generated by the VAE Encoder Subsystem 600 serves as the input to the Latent Transformer Subsystem 620. The Latent Transformer Subsystem 620 operates in this latent space, leveraging the compressed and informative representation to learn the complex patterns and relationships within the data. By working in the latent space, the Latent Transformer Subsystem 620 can efficiently process and model the data, capturing the intricate dependencies and generating accurate and meaningful outputs.

Once the Latent Transformer Subsystem 620 has processed the latent space representation, the generated output is passed through the VAE Decoder Subsystem 640. The VAE Decoder Subsystem 640 is responsible for decoding the latent space representation back into the original data space. Prior to processing by the VAE Decoder Subsystem 640, Latent Transformer Subsystem outputs may be compressed back to an original size before being processed by the expander 610 by being processed by a compressor 630. The VAE Decoder Subsystem 180 learns to reconstruct the original data from the latent space representation, ensuring that the generated output is coherent and meaningful.

The reconstructed output from the VAE Decoder Subsystem 640 is provided as a compressed blockchain output 650. The compressed blockchain output 650 represents the final result of the Latent Transformer LCM system, which is a compressed version of the original blockchain input.

The VAE Encoder Subsystem 600 and VAE Decoder Subsystem 640 play large roles in the overall functioning of the Latent Transformer deep learning core 120. The VAE Encoder Subsystem 600 enables the system to learn a compressed and informative representation of the input data in the latent space, while the VAE Decoder Subsystem 640 ensures that the compressed blockchain output 650 is coherent and meaningful by reconstructing it back into the original data space. The combination of these subsystems allows the Latent Transformer deep learning core 120 to focus on learning the complex patterns and relationships within the data, leading to accurate and context-aware outputs.

The specific architectures and parameters of the VAE Encoder Subsystem 600, Latent Transformer Subsystem 620, and VAE Decoder Subsystem 640 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the Latent Transformer deep learning core 120. An example using exemplary PyTorch pseudocode of a system for compressing and re-securing compromised blockchains using a latent transformer deep learning core may be found in APPENDIX B.

Figure 7:
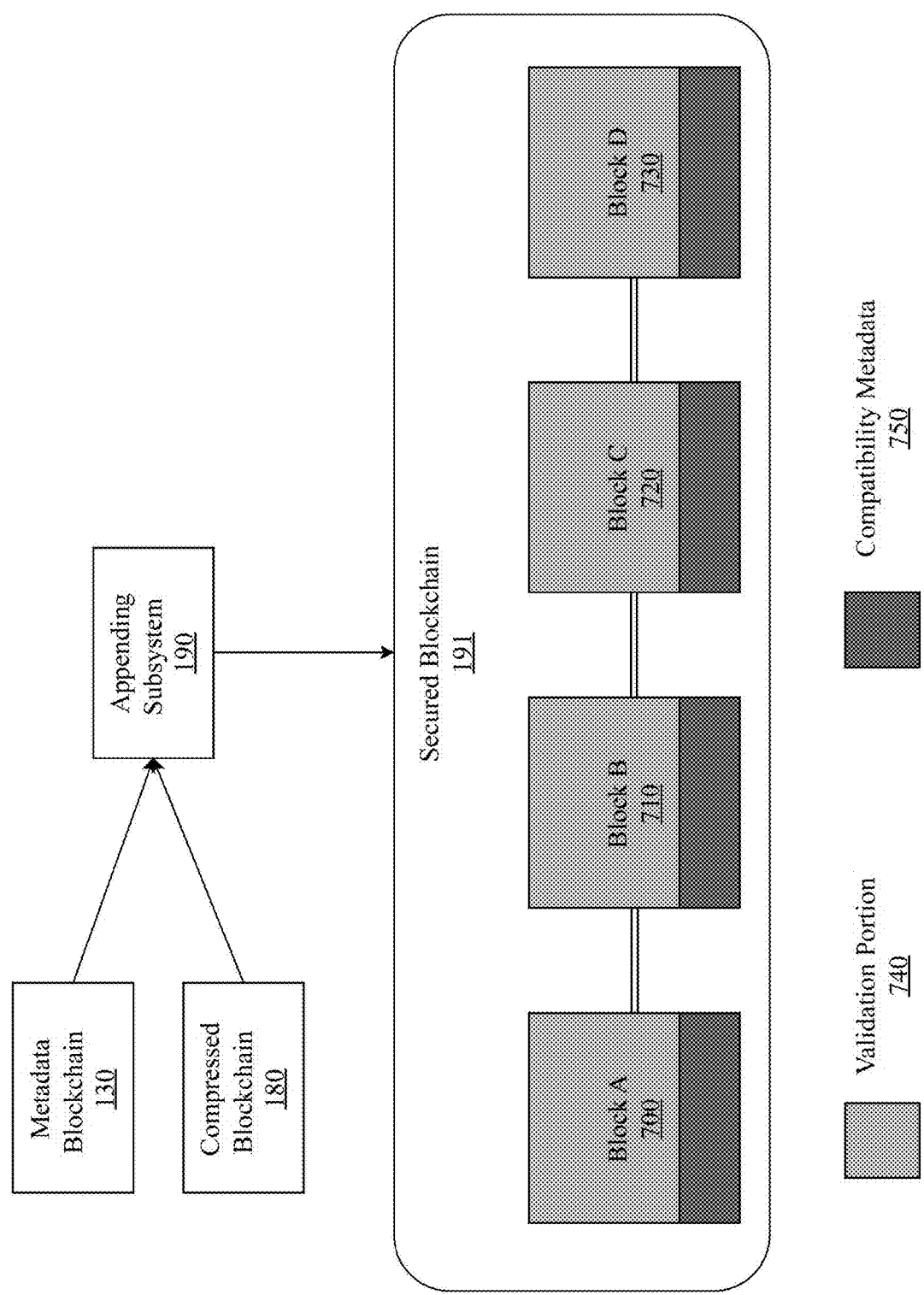
FIG. 7 is a block diagram illustrating an exemplary system for appending compatibility metadata into a compressed blockchain.

FIG. 7 is a block diagram illustrating an exemplary system for appending compatibility metadata into a compressed blockchain. This appending process is a step in ensuring backward compatibility with existing systems while leveraging the benefits of the compressed and secured blockchain.

A compressed blockchain 180 is the output generated by the deep learning core 120 and the hashing function 170. It represents a compressed and rehashed version of the original blockchain data, where each block in the chain has undergone compression and has been assigned a new hash value. In the example shown, the compressed blockchain 180 comprises four blocks: Block A 700, Block B 710, Block C 720, and Block D 730. These blocks contain the compressed data and the corresponding hash values, forming a secure and efficient representation of the blockchain.

On the other hand, a metadata blockchain 130 is generated by the metadata subsystem 215 and contains essential metadata information about the original blockchain. The metadata includes but is not limited to details such as block headers, transaction hashes, timestamps, and other relevant data that describe the structure and properties of the original blockchain. The metadata blockchain 130 serves as a complementary component to the compressed blockchain 180, providing the necessary context and enabling backward compatibility.

An appending subsystem 190 is responsible for combining the compressed blockchain 180 and the metadata blockchain 130 to create a secured blockchain 191. This subsystem takes the two blockchain components as input and performs the appending process to generate a single, integrated blockchain structure. The appending process involves linking the metadata from the metadata blockchain 130 to the corresponding blocks in the compressed blockchain 180. The appending subsystem 190 associates the metadata with the respective blocks, creating a unified structure. The resulting secured blockchain 191 consists of two main portions: the validation portion 740 and the compatibility metadata 750.

The appending subsystem 190 starts by aligning the blocks from the compressed blockchain 180 with their corresponding metadata from the metadata blockchain 130. Each block in the compressed blockchain 180 has a unique identifier or hash value that serves as a reference point for the appending process. The appending subsystem 190 uses these identifiers to match the compressed blocks with their respective metadata. Once the alignment is established, the appending subsystem 190 begins the actual appending process. For each block in the compressed blockchain 180, the subsystem creates a new block structure that combines the compressed data and the associated metadata. This new block structure forms the basis of the secured blockchain 191. An example using exemplary PyTorch pseudocode of a system for appending metadata to a compressed blockchain may be found in APPENDIX C.

The appending process can be illustrated with an example. Let's consider Block B 710 from the compressed blockchain 180. The appending subsystem 190 retrieves the compressed data of Block B 710 and its corresponding metadata from the metadata blockchain 130. The metadata may include information such as the original block header, transaction hashes, timestamps, and other relevant details. The appending subsystem 190 then creates a new block structure for Block B 710 in the secured blockchain 191.

This new block consists of two main parts: the validation portion 740 and the compatibility metadata 750.

The compatibility metadata 750 is appended to the validation portion 740 within the new block structure. It includes the metadata information retrieved from the metadata blockchain 130 for Block B 710. This metadata is essential for maintaining backward compatibility and allowing existing systems to interpret and interact with the secured blockchain 191 seamlessly. The appending subsystem 190 repeats this process for each block in the compressed blockchain 180, creating a corresponding block structure in the secured blockchain 191 that combines the compressed data and the associated metadata. The resulting secured blockchain 191 maintains the order and relationships between the blocks, ensuring the integrity and consistency of the blockchain data.

The validation portion 740 represents the compressed and rehashed blocks of the blockchain, which have been processed by the deep learning core 120 and the hashing function 170. This portion contains the secure and efficient representation of the blockchain data, ensuring the integrity and immutability of the stored information. The validation portion 740 serves as the primary reference for validating and verifying the blockchain transactions.

The compatibility metadata 750, on the other hand, contains the metadata information associated with each block in the validation portion 740. This metadata is appended to the corresponding blocks and provides the necessary context and backward compatibility with existing systems. The compatibility metadata 750 includes but is not limited to details such as block headers, transaction hashes, timestamps, and other relevant information that allows legacy systems to interpret and interact with the secured blockchain 191 seamlessly.

By combining the validation portion 740 and the compatibility metadata 750, the appending subsystem 190 creates a comprehensive and backward-compatible blockchain structure. The secured blockchain 191 retains the security and efficiency benefits of the compressed and rehashed data while ensuring interoperability with existing blockchain-based systems.

The appending process is a critical step in the overall blockchain compression and securing mechanism. It enables the integration of the compressed and rehashed data with the necessary metadata, facilitating a smooth transition from the original blockchain to the optimized and secure version. The resulting secured blockchain 191 can be readily adopted by existing systems, allowing them to benefit from the enhanced security, efficiency, and scalability provided by the deep learning core 120 and the hashing function 170 while maintaining compatibility with legacy infrastructure. This process ensures the creation of a backward-compatible and secure blockchain structure, enabling seamless integration with existing systems while leveraging the benefits of the deep learning-based compression and hashing techniques.

Detailed Description of Exemplary Aspects

Figure 8:
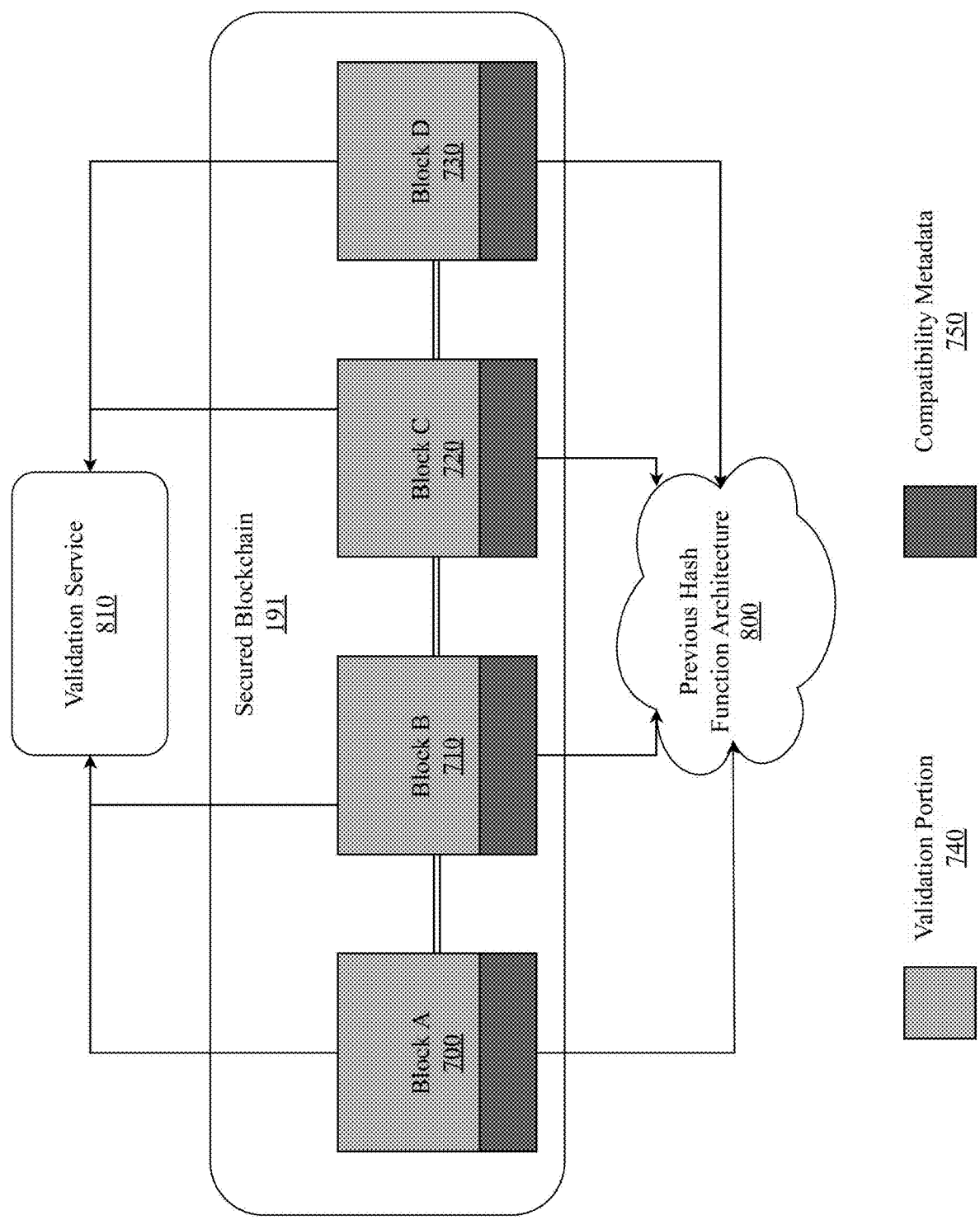
FIG. 8 is a block diagram illustrating an exemplary blockchain with a compatibility portion and a security portion, where the compatibility portion allows for interoperability with existing systems.

FIG. 8 is a block diagram illustrating an exemplary blockchain with a compatibility portion and a security portion, where the compatibility portion allows for interoperability with existing systems. Consider an example scenario where a widely used hash function, such as SHA-256, is found to have vulnerabilities that could be exploited by attackers. In this case, it becomes necessary to migrate the blockchain to a new and secure hash function, such as SHA-3, to maintain the integrity and trustworthiness of the blockchain data.

The process of re-securing the compromised blockchain involves rehashing the entire blockchain data using the new and secure hash function (SHA-3). This is where the deep learning core 120 and the updated hashing function 170 come into play. The deep learning core 120 efficiently compresses the blockchain data, and the updated hashing function 170 rehashes the compressed data using SHA-3, creating a new and secure version of the blockchain—the secured blockchain 191. The secured blockchain 191 comprises of a series of blocks, each representing a specific stage or state of the blockchain data. In the example shown, there are four blocks: Block A 700, Block B 710, Block C 720, and Block D 730. Each block in the secured blockchain 191 is composed of two main portions: the validation portion 740 and the compatibility metadata 750.

The validation portion 740 contains the compressed and rehashed data that has been processed using SHA-3. This portion represents the secure and tamper-proof version of the blockchain data. A validation service 810 operates on the validation portion 740 and utilizes SHA-3 to validate and verify the integrity of the blockchain data. It applies the SHA-3 hash function to the block data and compares the resulting hash value with the stored hash value in the validation portion 740 to ensure the data remains unaltered.

However, the challenge arises when integrating the secured blockchain 191 with existing systems and infrastructure that still rely on the compromised SHA-256 hash function. This is where the compatibility metadata 750 comes into play. The compatibility metadata 750 includes the previous hashes that were assigned by the SHA-256 hash function that was used in the original blockchain. By including the previous hash data in the compatibility metadata 750, the system maintains a connection between the secured blockchain 191 and the previous hash function architectures 800 that use SHA-256. The compatibility metadata 750 acts as a bridge, allowing the secured blockchain 191 to be seamlessly integrated into the previous hash function architectures 800.

When a legacy system needs to validate a block in the secured blockchain 191, it can still use its existing validation processes and algorithms that rely on SHA-256. The compatibility metadata 750 provides the necessary information and context for the legacy system to understand and validate the block data using the previous hash function architecture. This ensures backward compatibility and enables a smooth transition from the compromised blockchain to the secured blockchain 191.

For example, let's consider Block B 710 in the secured blockchain 191. The validation portion 740 of Block B 710 contains the compressed and rehashed data using SHA-3, ensuring its security and integrity. However, the compatibility metadata 750 of Block B 710 includes the previous hash value calculated using SHA-256, allowing legacy systems to validate the block using their existing SHA-256-based validation processes.

Figure 9:
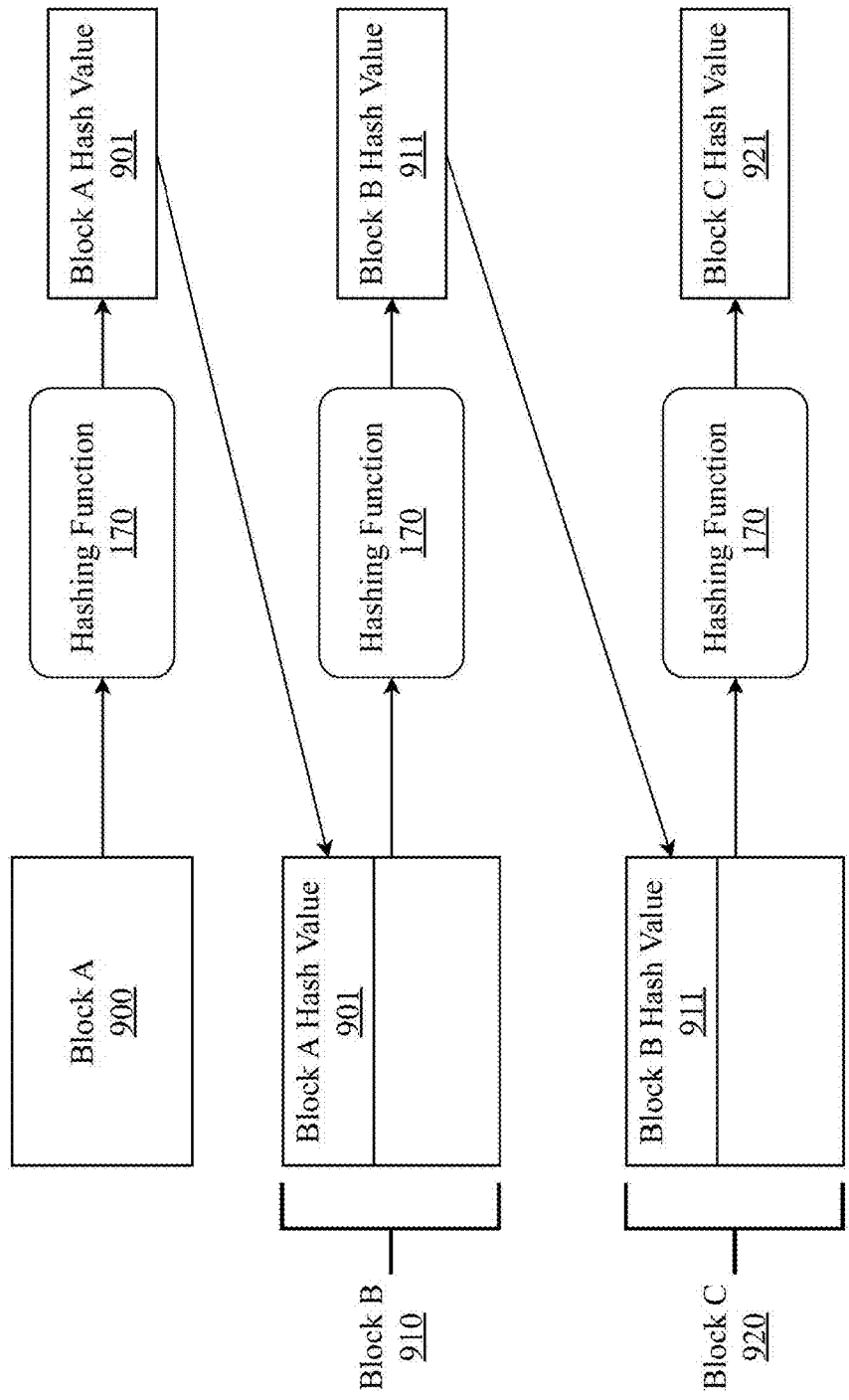
FIG. 9 is a block diagram illustrating an exemplary system for hashing compressed blocks.

FIG. 9 is a block diagram illustrating an exemplary system for hashing compressed blocks. This process ensures the integrity and immutability of the blockchain by creating a secure and tamper-evident chain of blocks. The provided example depicts three blocks in the compressed blockchain: Block A 900, Block B 910, and Block C 920. Each block contains its own data, which has been compressed using the deep learning-based compression technique enabled by the deep learning core.

The hashing process begins with Block A 900. The data within Block A 900 is passed through the hashing function 170, which applies a cryptographic hash algorithm to compute a unique and fixed-size hash value for Block A, referred to as Block A hash value 901. The Hashing Function 170 takes the compressed data of Block A as input and generates a hash value that serves as a digital fingerprint of Block A's content.

Next, the Block A hash value 901 is embedded into the subsequent block, Block B 910. This means that the hash value of Block A becomes a part of the data contained within Block B. By including the hash value of the previous block, a link is established between Block A and Block B, creating a chain-like structure.

The data of Block B 910, which now includes the Block A hash value 901, is then passed through the same hashing function 170. The hashing function 170 computes a new hash value for Block B, referred to as Block B hash value 911. This hash value represents the combined data of Block B and the embedded Block A hash value 901.

The process continues with Block C 920. The Block B hash value 911 is embedded into Block C, establishing a link between Block B and Block C. Once again, the data of Block C, including the embedded Block B hash value 911, is passed through the hashing function 170 to generate the Block C hash value 921.

This hashing process is repeated for all the blocks in the compressed blockchain. Each block's hash value is embedded into the subsequent block, creating a chain of interconnected hash values. This chaining mechanism ensures the integrity of the blockchain, as any modification to the data within a block will result in a change to its hash value, which in turn will affect the hash values of all subsequent blocks. The embedding of hash values and the chaining of blocks through hashing provide several key benefits. If any data within a block is altered, the hash value of that block will change, and the subsequent blocks' hash values will no longer match the embedded hash values, indicating tampering. Once a block is added to the blockchain and its hash value is embedded into the next block, it becomes extremely difficult to modify or delete the block without detection. An example using exemplary PyTorch pseudocode of a system for hashing compressed blocks within a compressed blockchain may be found in APPENDIX C.

Figure 10:
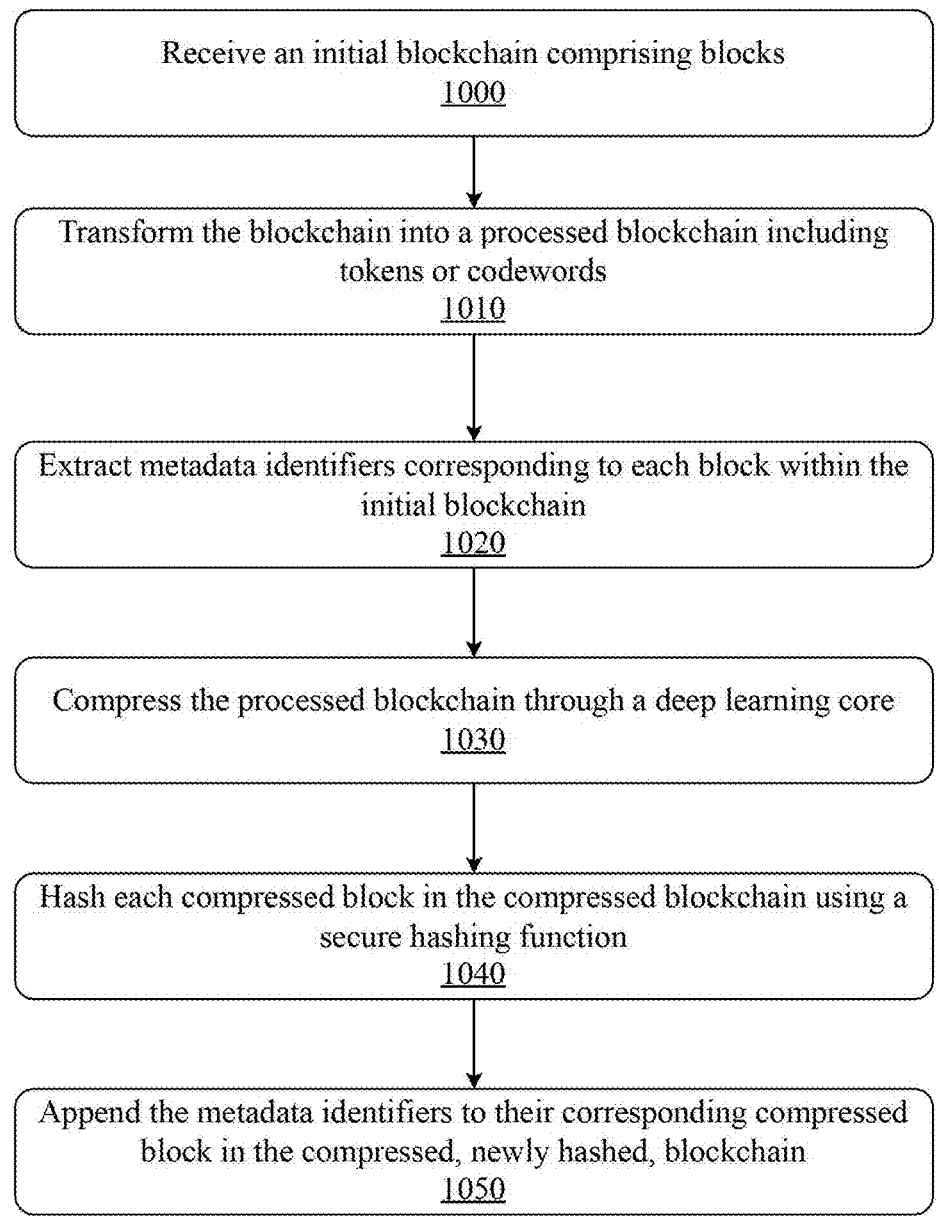
FIG. 10 is a flow diagram illustrating an exemplary method for blockchain management using large codeword models.

FIG. 10 is a flow diagram illustrating an exemplary method for blockchain management using large codeword models. The method involves transforming an initial blockchain, compressing it using a deep learning core, hashing the compressed blocks with a secure hashing function, and appending metadata identifiers to the corresponding compressed blocks. In a first step 1000, an initial blockchain comprising blocks is received. This initial blockchain represents the original blockchain data that needs to be secured and processed.

In a step 1010, the initial blockchain is transformed into a processed blockchain that includes tokens or codewords. This transformation involves tokenizing the blockchain data into sourceblocks and assigning unique codewords to each sourceblock based on a codebook. The tokenization process breaks down the blockchain data into smaller, manageable units, while the codeword assignment compresses the data and prepares it for further processing.

In a step 1020, metadata identifiers corresponding to each block within the initial blockchain are extracted. These metadata identifiers contain important information about the blocks, such as block headers, transaction hashes, timestamps, and other relevant details. The extracted metadata identifiers will be used later to ensure compatibility with legacy systems.

In a step 1030, the processed blockchain undergoes compression through a deep learning core. The deep learning core applies advanced compression techniques to the tokens or codewords representing the blockchain data. This compression step aims to reduce the size of the blockchain while preserving its essential information. The deep learning core learns patterns and relationships within the data, enabling efficient compression.

In a step 1040, each compressed block in the compressed blockchain is hashed using a secure hashing function. The hashing function takes the compressed data of each block as input and generates a unique and fixed-size hash value. The specific hashing function used can be a cryptographically secure algorithm like SHA-256 or SHA-3, which ensures the integrity and tamper-evidence of the blockchain. The resulting hash values serve as digital fingerprints of the compressed blocks.

In a step 1050, the metadata identifiers extracted in step 1020 are appended to their corresponding compressed blocks in the compressed, newly hashed blockchain. This appending process creates a secured blockchain that consists of two main components: the compressed and hashed blocks, and the appended metadata identifiers. The metadata identifiers provide a link between the compressed blockchain and the original blockchain, enabling compatibility with legacy systems that rely on the original blockchain structure and metadata.

The appending of metadata identifiers to the compressed and hashed blocks is crucial for maintaining backward compatibility. Legacy systems can still validate and interact with the secured blockchain by accessing the appended metadata identifiers. These identifiers allow the legacy systems to retrieve the necessary information about the blocks, such as block headers and transaction hashes, without requiring them to understand the compressed and hashed format of the secured blockchain. This method creates a secured blockchain that combines the benefits of deep learning-based compression, secure hashing, and metadata appending. The resulting blockchain is compressed, tamper-evident, and compatible with legacy systems. The deep learning core enables efficient compression of the blockchain data, reducing storage and processing requirements. The secure hashing function ensures the integrity and immutability of the compressed blocks, making it difficult for attackers to modify the blockchain without detection. The appended metadata identifiers provide a bridge between the secured blockchain and the legacy systems, allowing seamless integration and compatibility.

Figure 11:
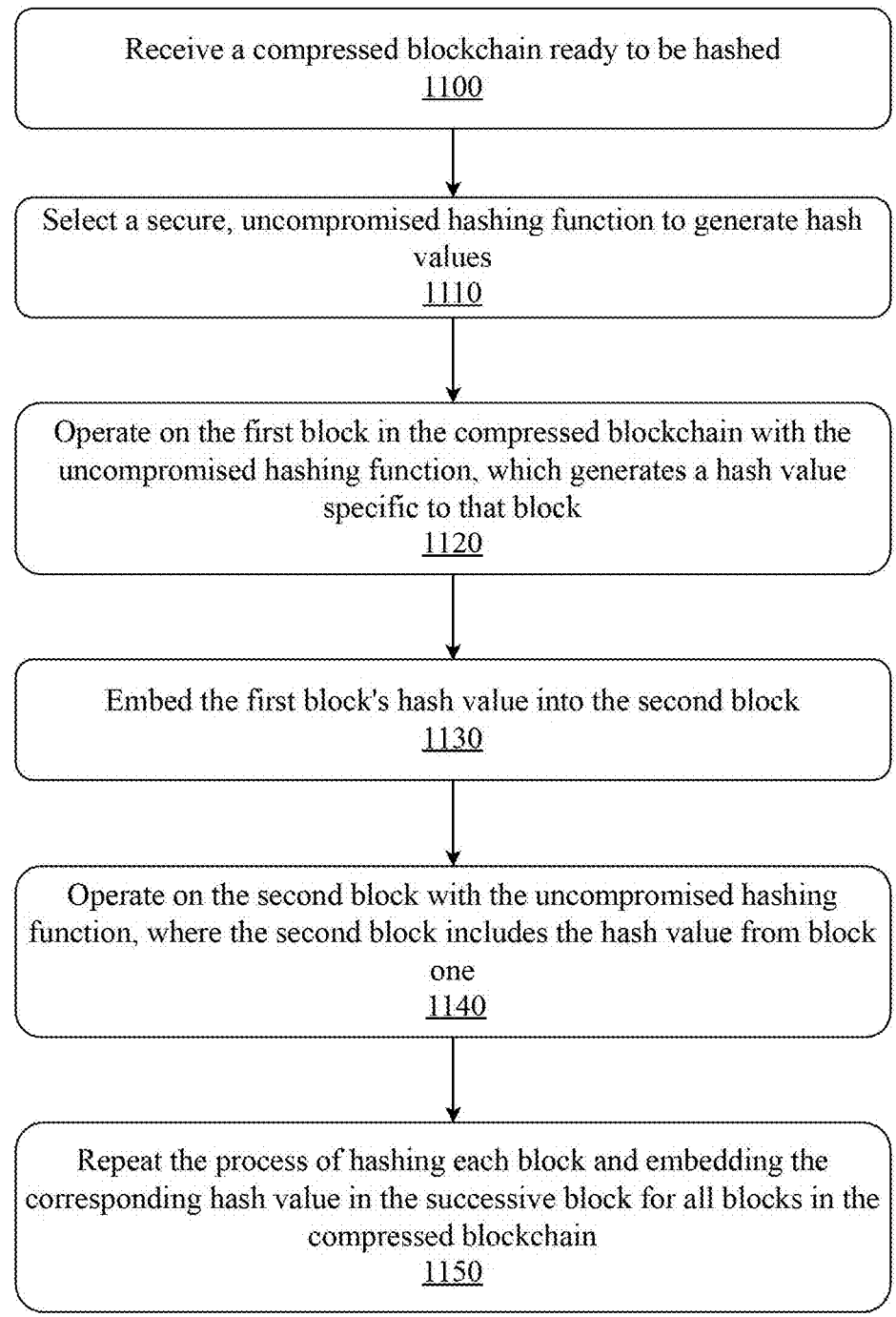
FIG. 11 is a flow diagram illustrating an exemplary method for hashing compressed blocks.

FIG. 11 is a flow diagram illustrating an exemplary method for hashing compressed blocks. The method involves generating hash values for each block in the compressed blockchain and embedding the hash values of each block into the subsequent block, creating a tamper-evident and immutable chain of blocks. In a first step 1100, a compressed blockchain that is ready to be hashed is received. This compressed blockchain has undergone a compression process, such as using a deep learning core, to reduce its size while preserving the essential information.

In a step 1110, a secure and uncompromised hashing function is selected to generate hash values for the blocks in the compressed blockchain. The chosen hashing function should be cryptographically secure, meaning it should be computationally infeasible to find collisions or reverse-engineer the input data from the hash value. Examples of suitable hashing functions include SHA-256 and SHA-3.

In a step 1120, the first block in the compressed blockchain is operated on with the selected uncompromised hashing function. The hashing function takes the compressed data of the first block as input and generates a unique hash value specific to that block. This hash value serves as a digital fingerprint of the block's content. In a step 1130, the hash value generated for the first block is embedded into the second block of the compressed blockchain. This embedding process creates a link between the first and second blocks, establishing a chain-like structure. The hash value of the first block becomes part of the data contained within the second block.

In a step 1140, the second block, which now includes the embedded hash value from the first block, is operated on with the same uncompromised hashing function. The hashing function takes the compressed data of the second block, along with the embedded hash value of the first block, as input and generates a new hash value specific to the second block. This new hash value represents the combined data of the second block and the embedded hash value from the first block.

In a step 1150, the process of hashing each block and embedding the corresponding hash value in the successive block is repeated for all the blocks in the compressed blockchain. Each block's hash value is calculated using the uncompromised hashing function, and the resulting hash value is embedded into the subsequent block. This iterative process creates a chain of interconnected hash values, where each block's hash value depends on the data of the current block and the hash value of the previous block.

The embedding of hash values and the chaining of blocks through hashing provide several important benefits. If any data within a block is modified, the hash value of that block will change, and the subsequent blocks' hash values will no longer match the embedded hash values. This discrepancy indicates that tampering has occurred, making it easy to detect any unauthorized modifications to the blockchain. Once a block is added to the blockchain and its hash value is embedded into the next block, it becomes computationally infeasible to modify or delete the block without breaking the chain of hash values. Any attempt to alter a block would require recalculating the hash values of all subsequent blocks, which is practically impossible. The integrity of the blockchain can be verified by recomputing the hash values of each block and comparing them with the embedded hash values. If all the hash values match, it confirms that the blockchain has not been tampered with and maintains its integrity.

The compressed blockchain is hashed using a secure and uncompromised hashing function, creating a tamper-evident and immutable chain of blocks. The embedding of hash values and the chaining of blocks ensure the integrity and security of the blockchain, making it resistant to unauthorized modifications and enabling easy verification of its authenticity.

Figure 12:
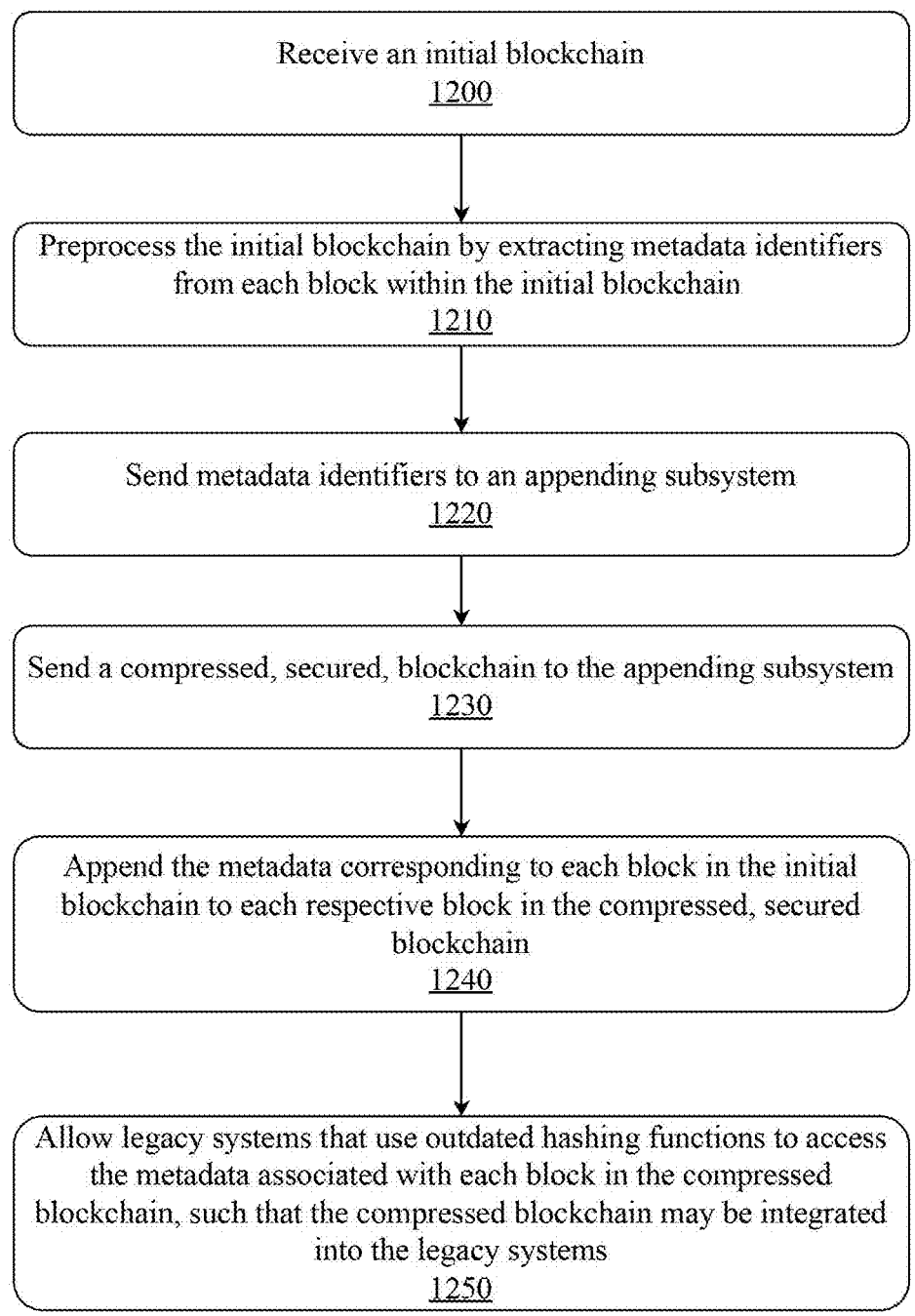
FIG. 12 is a flow diagram illustrating an exemplary method for appending compatibility metadata into a compressed blockchain.

FIG. 12 is a flow diagram illustrating an exemplary method for appending compatibility metadata into a compressed blockchain. The method involves preprocessing the initial blockchain, extracting metadata identifiers, and appending the metadata to the corresponding blocks in the compressed and secured blockchain, enabling compatibility with legacy systems. In a first step 1200, an initial blockchain is received. This initial blockchain represents the original blockchain data that needs to be secured and integrated into legacy systems.

In a step 1210, the initial blockchain undergoes a preprocessing step, where metadata identifiers are extracted from each block within the initial blockchain. The metadata identifiers contain important information about the blocks, such as block headers, transaction hashes, timestamps, and other relevant details. These identifiers will be used later to ensure compatibility with legacy systems. In a step 1220, the extracted metadata identifiers are sent to an appending subsystem. The appending subsystem is responsible for combining the metadata identifiers with the compressed and secured blockchain.

In a step 1230, a compressed and secured blockchain is sent to the appending subsystem. This blockchain has undergone compression using techniques like deep learning-based compression and has been secured using a secure hashing function. The compressed and secured blockchain represents a more efficient and tamper-evident version of the original blockchain.

In a step 1240, the appending subsystem appends the metadata identifiers corresponding to each block in the initial blockchain to their respective blocks in the compressed and secured blockchain. This appending process creates a unified blockchain structure that combines the compressed and secured data with the metadata identifiers. The metadata identifiers serve as a bridge between the original blockchain and the compressed and secured version, allowing legacy systems to access and interpret the blockchain data.

In a step 1250, legacy systems that use outdated hashing functions are allowed to access the metadata associated with each block in the compressed blockchain. The appended metadata identifiers provide the necessary information for the legacy systems to validate and interact with the blockchain data. Even though the legacy systems may not be compatible with the compressed and secured format of the blockchain, they can still retrieve the required block information from the metadata identifiers.

By accessing the metadata, legacy systems can perform their own validation and verification processes using the outdated hashing functions they rely on. The metadata identifiers act as a compatibility layer, enabling the legacy systems to work with the compressed and secured blockchain without requiring significant modifications or upgrades to their existing infrastructure.

The integration of the compressed and secured blockchain into legacy systems through metadata appending offers several advantages. Legacy systems can continue to operate and interact with the blockchain data using their existing validation and verification processes, even if they are based on outdated hashing functions. The appended metadata identifiers provide the necessary information for the legacy systems to function properly.

The compressed and secured blockchain can be seamlessly integrated into the legacy systems without disrupting their operations. The metadata identifiers act as a bridge, allowing the legacy systems to access and interpret the blockchain data in a compatible format. While the legacy systems may use outdated hashing functions, the compressed and secured blockchain itself is protected by a secure and up-to-date hashing function. This ensures the integrity and tamper-evidence of the blockchain data, even if the legacy systems have vulnerabilities or weaknesses in their hashing mechanisms.

The integration of the compressed and secured blockchain into legacy systems through metadata appending enables a gradual transition towards more advanced and secure blockchain technologies. Organizations can adopt the compressed and secured blockchain while still maintaining compatibility with their existing systems, allowing for a smooth migration process. The compressed and secured blockchain can be successfully integrated into legacy systems that use outdated hashing functions. The metadata appending process ensures backward compatibility, seamless integration, enhanced security, and a gradual transition towards more advanced blockchain technologies.

Exemplary Computing Environment

Figure 13:
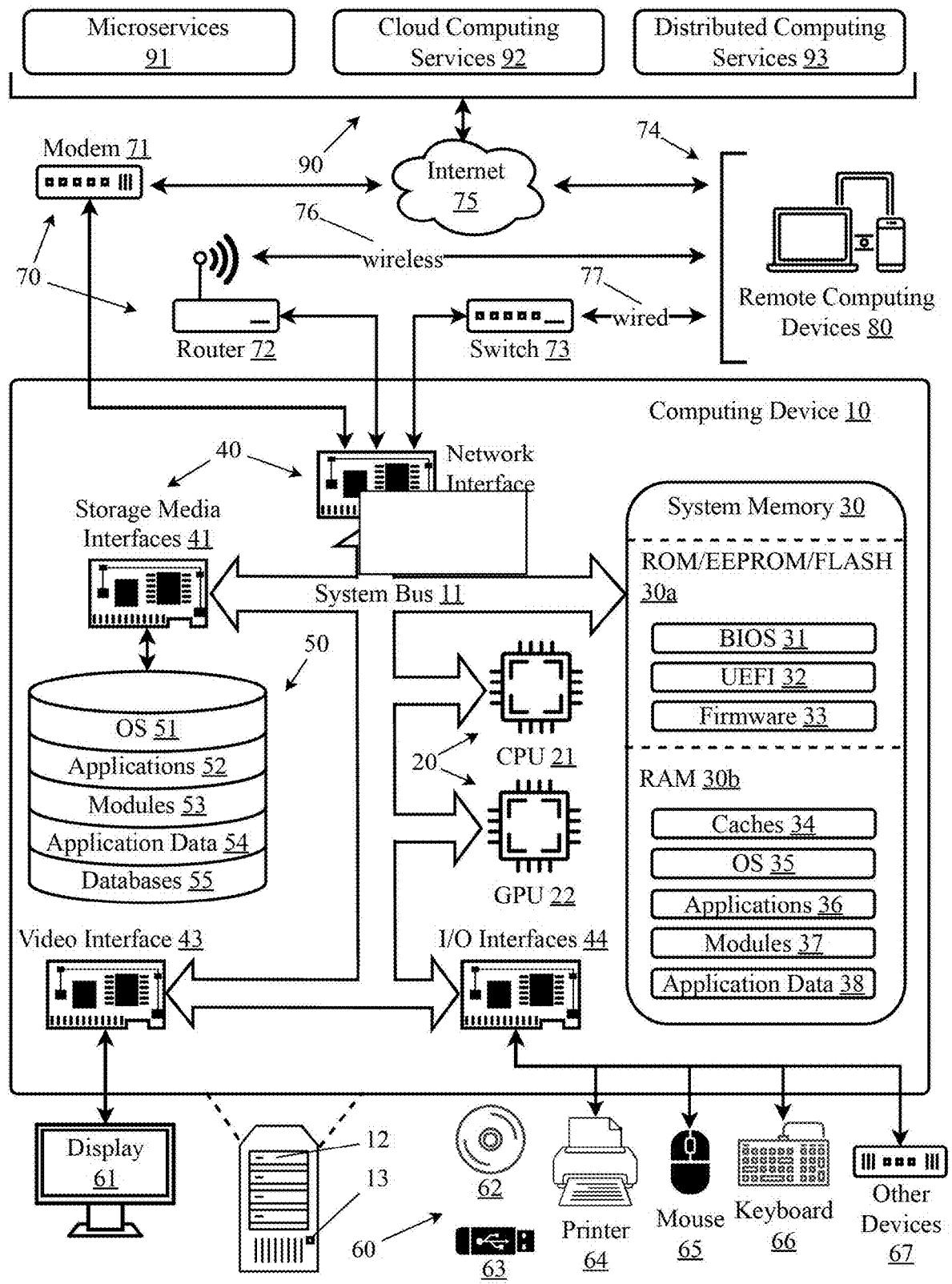
FIG. 13 illustrates an exemplary computing environment on which an embodiment described herein may be implemented.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

APPENDIX A: SAMPLE EXEMPLARY PESUDOCODE FOR A SYSTEM FOR COMPRESSING AND RE-SECURING BLOCKCHAIN DATA USING A LARGE CODEWORD MODEL WITH DEEP LEARNING

```
import torch
import torch.nn as nn
# Codeword Allocation
def assign_codewords(sourceblocks):
    codewords=[ ]
    for block in sourceblocks:
        # Perform frequency-based coding or hash function
            assignment
        codeword=assign_codeword(block)
        codewords.append(codeword)
    return codewords
# Deep Learning Core(Transformer Architecture)
class TransformerCore(nn.Module):
    def_init_(self, input_dim, hidden_dim, num_layers):
        super(TransformerCore, self)._init_( )
        self.encoder=nn.TransformerEncoder(nn.Trans-
            formerEncoderLayer(input_dim, hidden_dim),
            num_layers
        )
    def forward(self, x):
        x=self.encoder(x)
        return x
# Metadata Appending
def append_metadata(compressed_blocks, metadata):
    appended_blocks=[ ]
    for block, meta in zip(compressed_blocks, metadata):
        # Append metadata to the compressed block append-
            ed_block={
            'compressed_data': block,
            'metadata': meta
        }
        appended_blocks.append(appended_block)
    return appended_blocks
# Main LCM System
def lcm_system(blockchain_data):
    # Step 1: Tokenize blockchain into sourceblocks
    sourceblocks=tokenize_blockchain(blockchain_data)
    # Step 2: Assign codewords to sourceblocks
    codewords=assign_codewords(sourceblocks)
    # Step 3: Compress codewords using deep learning
        core
        transformer_core=TransformerCore(input_dim=len
            (codewords), hidden_dim=512, num_layers=6)
        compressed_blocks=transformer_core(torch.tensor
            (codewords))
    # Step 4: Secure compressed blocks with hashing
    hashed_blocks=secure_hashing(compressed-
        _blocks)
    # Step 5: Embed hash values in successive blocks
    embedded_blocks=embed_hash_values(hashed-
        _blocks)
    # Step 6: Extract metadata identifiers
    metadata=extract_metadata(blockchain_data)
    # Step 7: Append metadata to compressed blocks
    appended_blocks=append_metadata(embedded-
        _blocks, metadata)
    return appended_blocks
# Example usage
blockchain_data=[ . . . ] # Blockchain data as input
secured_blockchain=1 cm_system(blockchain_data)
```

APPENDIX B: SAMPLE EXEMPLARY PESUDOCODE FOR A LATENT TRANSFORMER BASED DEEP LEARNING CORE

```
import torch
import torch.nn as nn
# Codeword Allocation
def assign_codewords(sourceblocks):
    codewords=[ ]
    for block in sourceblocks:
        # Perform frequency-based coding or hash function
            assignment
        codeword=assign_codeword(block)
        codewords.append(codeword)
    return codewords
# VAE Encoder
class VAEEncoder(nn.Module):
    def_init_(self, input_dim, hidden_dim, latent_dim):
        super(VAEEncoder, self)._init_( )
        self.fc1=nn.Linear(input_dim, hidden_dim)
```

```
        self.fc2_mean=nn.Linear(hidden_dim, latent_dim)
        self.fc2_logvar=nn.Linear(hidden_dim, latent_dim)
    def forward(self, x):
        x=torch.relu(self.fc1(x))
        mean=self.fc2_mean(x)
        log var=self.fc2_log var(x)
        return mean, log var
# Latent Transformer Core
class LatentTransformerCore(nn.Module):
    def_init_(self, latent_dim, hidden_dim, num_layers,
            num_heads):
        super(LatentTransformerCore, self)._init_( )
        self.encoder_layer=nn.TransformerEncoderLayer
            (latent_dim, num_heads, hidden_dim)
        self.transformer_encoder=nn. TransformerEncoder
            (self.encoder_layer, num_layers)
    def forward(self, x):
        x=self.transformer_encoder(x)
        return x
# Metadata Appending
def append_metadata(compressed_blocks, metadata):
    appended_blocks=[ ]
    for block, meta in zip(compressed_blocks, metadata):
        # Append metadata to the compressed block
        appended_block={
            'compressed_data': block,
            'metadata': meta
        }
        appended_blocks.append(appended_block)
    return appended_blocks
# Main LCM System
def lcm_system(blockchain_data):
    # Step 1: Tokenize blockchain into sourceblocks
    sourceblocks=tokenize_blockchain(blockchain_data)
    # Step 2: Assign codewords to sourceblocks
    codewords=assign_codewords(sourceblocks)
    # Step 3: Compress codewords using VAE encoder
    vae_encoder=VAEEncoder(input_dim=len(code-
        words), hidden_dim=512, latent_dim=256)
    latent_vars=vae_encoder(torch.tensor(codewords))
    # Step 4: Process latent variables using Latent Trans-
        former
    latent_transformer=LatentTransformerCore(la-
        tent_dim=256,  hidden_dim=512,  num_layers=6,
        num_heads=8)
    compressed_blocks=latent_transformer(latent_vars[0])
    # Use mean of latent variables
    # Step 5: Secure compressed blocks with hashing
    hashed_blocks=secure_hashing(compressed-
        _blocks)
    # Step 6: Embed hash values in successive blocks
    embedded_blocks=embed_hash_values(hashed-
        _blocks)
    #  Step  7:  Extract  metadata  identifiers
    metadata=extract_metadata(blockchain_data)
    # Step 8: Append metadata to compressed blocks
    appended_blocks=append_metadata(embedded-
        _blocks, metadata)
    return appended_blocks
# Example usage
blockchain_data=[ . . . ] # Blockchain data as input
secured_blockchain=1 cm_system(blockchain_data)
```

APPENDIX C: SAMPLE EXEMPLARY
PESUDOCODE FOR A HASHING FUNCTION
AND APPENDING SUBSYSTEM

```
import torch
import torch.nn as nn
# Hashing Function
class HashingFunction(nn.Module):
    def_init_(self, input_dim, hidden_dim, output_dim):
        super(HashingFunction, self)._init_( )
        self.fc1=nn.Linear(input_dim, hidden_dim)
        self.fc2=nn.Linear(hidden_dim, output_dim)
    def forward(self, x):
        x=torch.relu(self.fc1(x))
        x=self.fc2(x)
        return x
# Appending Subsystem
class AppendingSubsystem:
    def_init_(self):
        pass
    def append_metadata(self, compressed_blocks, meta-
            data):
        appended_blocks=[ ]
        for block, meta in zip(compressed_blocks, meta-
                data):
            # Append metadata to the compressed block
            appended_block={
                'compressed_data': block,
                'metadata': meta
            }
            appended_blocks.append(appended_block)
        return appended_blocks
# Hashing Compressed Blocks
def hash_compressed_blocks(compressed_blocks):
    hashing_function=HashingFunction
        (input_dim=compressed_blocks.shape[1],  hid-
        den_dim=256, output_dim=256)
    hashed_blocks=[ ]
    for block in compressed_blocks:
        hashed_block=hashing_function(block)
        hashed_blocks.append(hashed_block)
    return torch.stack(hashed_blocks)
# Embedding Hash Values
def embed_hash_values(hashed_blocks):
    embedded_blocks=[ ]
    for i in range(len(hashed_blocks)-1):
        current_block=hashed_blocks[i]
        next_block=hashed_blocks[i+1]
        embedded_block=torch.cat((current_block,  next-
            _block), dim=0)
        embedded_blocks.append(embedded_block)
    return embedded_blocks
# Example usage
compressed_blocks= . . . # Compressed blocks from the
    deep learning core
metadata= . . .
# Metadata identifiers corresponding to each block
# Hashing compressed blocks
hashed_blocks=hash_compressed_blocks(compressed-
    _blocks)
# Embedding hash values in successive blocks
embedded_blocks=embed_hash_values(hashed_blocks)
# Appending metadata to compressed blocks
appending_subsystem=AppendingSubsystem( )
appended_blocks=appending_subsystem.append_metadata
    (embedded_blocks, metadata)
```

What is claimed is:

1. A system for secure, robust, and efficient blockchain management using large codeword models, comprising:
a computing device comprising at least a memory and a processor, and
a plurality of programing instructions that, when operating on the processor, cause the computing device to:

receive an initial blockchain comprising a plurality of blocks;

assign a plurality of codewords or tokens to a plurality of information represented within the plurality of blocks;

extract metadata identifiers corresponding to each block within the initial blockchain;

compress the plurality of codewords or tokens into a plurality of compressed blocks by learning relationships between the plurality tokens or codewords with a deep learning core, wherein the plurality of compressed blocks represents a compressed version of the information represented within the plurality of blocks;

secure the plurality of compressed blocks by passing the plurality of compressed blocks through a secure hash function, wherein each compressed block is assigned a secure hash value;

embed the secure hash value of a compressed block in a next successive compressed block for each compressed block within the plurality of compressed blocks; and append the metadata identifiers to their corresponding compressed block within the plurality of compressed blocks;

wherein the deep learning core employs a transformer architecture configured to process codewords assigned to sourceblocks derived from blockchain data, the transformer applying multihead attention to learn semantic relationships between the sourceblocks and generate a compressed representation of a blockchain undergoing the efficient blockchain management.

2. The system of claim 1, wherein the deep learning core comprises a latent transformer architecture.

3. A method for secure, robust, and efficient blockchain management using large codeword models, comprising the steps of:

receiving an initial blockchain comprising a plurality of blocks;

assigning a plurality of codewords or tokens to a plurality of information represented within the plurality of blocks;

extracting metadata identifiers corresponding to each block within the initial blockchain;

compressing the plurality of codewords or tokens into a plurality of compressed blocks by learning relationships between the plurality tokens or codewords with a deep learning core, wherein the plurality of compressed blocks represents a compressed version of the information represented within the plurality of blocks;

securing the plurality of compressed blocks by passing the plurality of compressed blocks through a secure hash function, wherein each compressed block is assigned a secure hash value;

embedding the secure hash value of a compressed block in a next successive compressed block for each compressed block within the plurality of compressed blocks; and appending the metadata identifiers to their corresponding compressed block within the plurality of compressed blocks;

wherein the deep learning core employs a transformer configured to process codewords assigned to sourceblocks derived from blockchain data, the transformer applying multihead attention to learn semantic relationships between the sourceblocks and generate a compressed representation of a blockchain undergoing the efficient blockchain management.

4. The method of claim 3, wherein the deep learning core comprises a latent transformer architecture.

5. A non-transitory, computer-readable storage media having computer-executable instructions embodied thereon that, when executed by one or more processors of a computing system employing an asset registry platform for secure, robust, and efficient blockchain management using large codeword models, cause the computing system to:

receive an initial blockchain comprising a plurality of blocks;

assign a plurality of codewords or tokens to a plurality of information represented within the plurality of blocks;

extract metadata identifiers corresponding to each block within the initial blockchain;

compress the plurality of codewords or tokens into a plurality of compressed blocks by learning relationships between the plurality tokens or codewords with a deep learning core, wherein the plurality of compressed blocks represents a compressed version of the information represented within the plurality of blocks;

secure the plurality of compressed blocks by passing the plurality of compressed blocks through a secure hash function, wherein each compressed block is assigned a secure hash value;

embed the secure hash value of a compressed block in a next successive compressed block for each compressed block within the plurality of compressed blocks; and append the metadata identifiers to their corresponding compressed block within the plurality of compressed blocks;

wherein the deep learning core employs a transformer architecture configured to process codewords assigned to sourceblocks derived from blockchain data, the transformer applying multihead attention to learn semantic relationships between the sourceblocks and generate a compressed representation of a blockchain undergoing the efficient blockchain management.

6. The media of claim 5, wherein the deep learning core comprises a latent transformer architecture.

\* \* \* \* \*